United States Patent
Yang et al.

(10) Patent No.: US 7,250,148 B2
(45) Date of Patent: Jul. 31, 2007

(54) METHOD FOR MAKING SINGLE-WALL CARBON NANOTUBES USING SUPPORTED CATALYSTS

(75) Inventors: Yuemei Yang, Houston, TX (US); Martin P. Grosboll, Kingwood, TX (US); Kenneth A. Smith, Houston, TX (US)

(73) Assignee: Carbon NanoTechnologies, Inc., Houston, TX (US)

( * ) Notice: Subject to any disclaimer, the term of this patent is extended or adjusted under 35 U.S.C. 154(b) by 367 days.

(21) Appl. No.: 10/630,054

(22) Filed: Jul. 30, 2003

(65) Prior Publication Data

US 2005/0074392 A1 Apr. 7, 2005

Related U.S. Application Data

(60) Provisional application No. 60/400,208, filed on Jul. 31, 2002.

(51) Int. Cl.
*D01F 9/12* (2006.01)
(52) U.S. Cl. .................. 423/447.3; 977/843
(58) Field of Classification Search ........... 423/447.3; 502/313, 316; 977/843
See application file for complete search history.

(56) References Cited

U.S. PATENT DOCUMENTS

| | | | | |
|---|---|---|---|---|
| 5,102,647 | A * | 4/1992 | Yamada et al. | 423/447.3 |
| 6,333,016 | B1 * | 12/2001 | Resasco et al. | 423/447.3 |
| 6,413,487 | B1 * | 7/2002 | Resasco et al. | 423/447.3 |
| 6,761,870 | B1 * | 7/2004 | Smalley et al. | 423/447.3 |
| 6,955,800 | B2 * | 10/2005 | Resasco et al. | 423/447.3 |

FOREIGN PATENT DOCUMENTS

| WO | WO00/17102 | 3/2000 |
|---|---|---|
| WO | WO00/73205 | 12/2000 |
| WO | WO01/94260 | 12/2001 |
| WO | WO03/037792 | 5/2003 |

OTHER PUBLICATIONS

Tang et al., *Chemical Physics Letters* 350:19-26 (2001).
Flahaut et al., *J. Mater. Chem.* 10:249-252 (2000).
Qingwen et al., *J. Mater. Chem.* 12:1179-1183 (2002).
Su et al., *Chemical Physics Letters* 322:321-326 (2000).
Willems et al., *Applied Catalysis A: General* 229:229-233 (2002).
Bacsa et al., *Chemical Physics Letters* 323:566-571 (2000).
Colomer et al., *Chemical Physics Letters* 317:83-89 (2000).
Bacsa et al., *J. Am. Ceram. Soc.* 85:2666-69 (2002).
PCT/US03/24012 Partial International Search Report (Jul. 27, 2005).
Kitiyanan et al., *Chemical Physics Letters* 317:497-503 (Feb. 4, 2000).
Hafner et al., *Chemical Physics Letters* 296:195-202 (Oct. 30, 1998).
Cheng et al., *Applied Physics Letters* 72:3282-3284 (Jun. 22, 1998).

* cited by examiner

*Primary Examiner*—Stuart Hendrickson
(74) *Attorney, Agent, or Firm*—Williams, Morgan & Amerson, P.C.

(57) ABSTRACT

A method for growing single-wall carbon nanotubes involves preparing a catalyst comprising catalytic metals, iron and molybdenum, and magnesium oxide support material and contacting the catalyst with a gaseous carbon-containing feedstock at a sufficient temperature and for a sufficient contact time to make single-wall carbon nanotubes. The weight ratio of iron and molybdenum can range from about 2 to 1 to about 10 to 1 and the metals loading up to about 10 wt % of the MgO. The catalyst can be sulfided. Methane is a suitable carbon-containing feedstock. The process can be conducted in batch, continuous or semi-continuous modes, in reactors, such as a transport reactor, fluidized bed reactor, moving bed reactors and combinations thereof. The process also includes making single-wall carbon nanotubes with catalysts comprising at least one Group VIB or Group VIIIB metal on supports such as magnesia, zirconia, silica, and alumina, where the catalyst is sulfided.

296 Claims, 19 Drawing Sheets

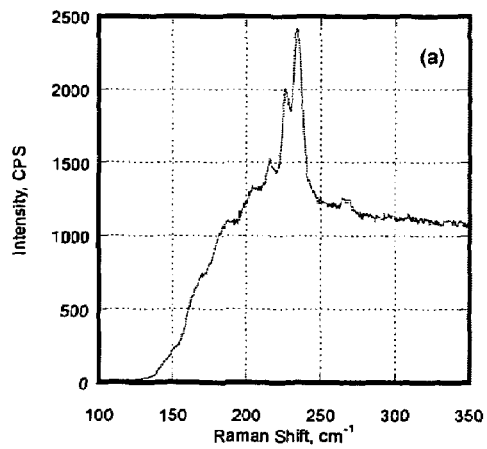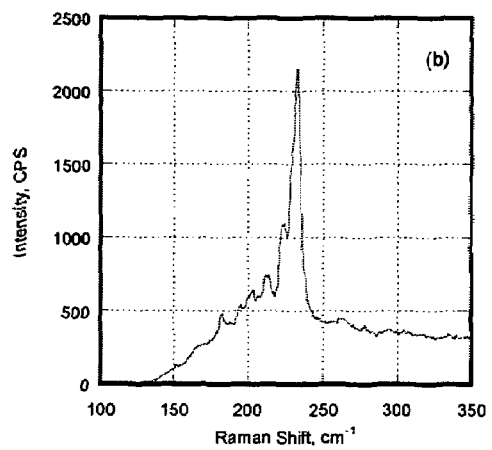
*Figure 11A*  *Figure 11B*
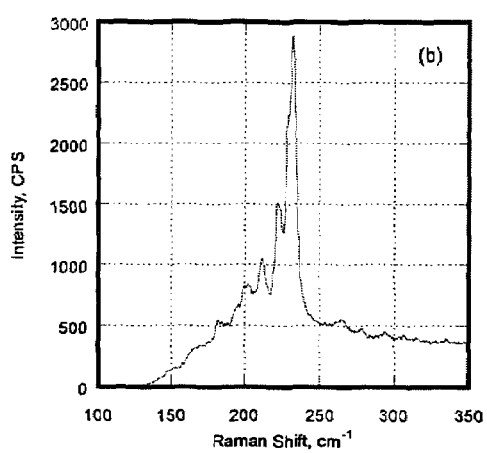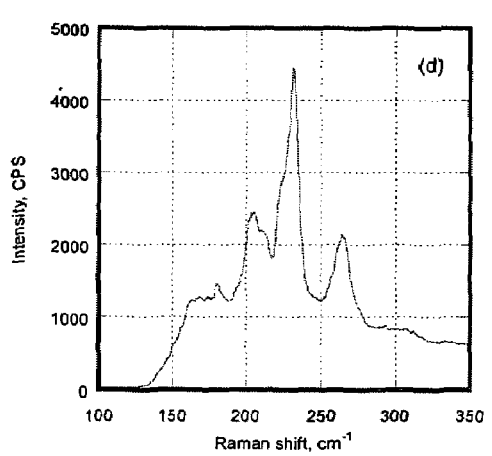
*Figure 11C*  *Figure 11D*

METHOD FOR MAKING SINGLE-WALL CARBON NANOTUBES USING SUPPORTED CATALYSTS

CROSS-REFERENCE TO RELATED APPLICATION

This application claims priority from U.S. provisional application Ser. No. 60/400,208, filed Jul. 31, 2002, which application is incorporated herein by reference.

FIELD OF THE INVENTION

This invention relates generally to a method for making single-wall carbon nanotubes.

BACKGROUND OF THE INVENTION

Single-wall carbon nanotubes are a novel form of carbon. They are closed-caged, cylindrical molecules, approximately 0.5 to 3 nanometers in diameter and a few hundred nanometers long. They are known for their excellent electrical and thermal conductivity and high tensile strength. Since their discovery in 1993, there has been substantial research to describe their properties and develop applications using them.

All methods for single-wall carbon nanotube production involve one or a combination of transition metal catalysts and a carbon-containing feedstock. Some of the methods to make single-wall carbon nanotubes include electric arc, laser ablation of graphite, and gas phase techniques with supported and unsupported metal catalyst.

The method to prepare carbon nanotubes on supported metal catalyst is known as "chemical vapor deposition" or "CVD". In this method, gaseous carbon-containing feedstock molecules react on nanometer-scale particles of catalytic metal supported on a substrate to form carbon nanotubes. This procedure has been used to produce multiwall carbon nanotubes, however, under certain reaction conditions, it can produce excellent single-wall carbon nanotubes. Synthesis of single-wall carbon nanotubes using CVD methodology has been described in Dai, et al. (1996), Chem. Phys. Lett., 260, p. 471-475, and "Catalytic Growth of Single-Wall Carbon Nanotubes from Metal Particles," International Pat. Publ. WO 00/17102 A1, published Mar. 30, 2000, each incorporated herein by reference. The single-wall carbon nanotube material that results from a CVD process comprises single-wall carbon nanotubes, residual catalyst metal particles, catalyst support material, and other extraneous carbon forms, which can be amorphous carbon, non-tubular fullerenes, and, in some cases, multiwall carbon nanotubes. The term "extraneous carbon" will be used herein as any carbon that is not in the form of single-wall carbon nanotubes, and can include graphene sheets, non-tubular fullerenes, multiwall carbon nanotubes, partial nanotube forms, amorphous carbon and other disordered carbon.

In many end-use applications for single-wall carbon nanotubes, it is desirable to use high-purity single-wall carbon nanotubes, containing only minimal amounts of residual catalyst metal, extraneous carbon and catalyst support material. Most CVD methods for producing single-wall carbon nanotubes suffer from relatively low product yields and poor economics. In order to produce a high purity single-wall carbon nanotube product, the product must either be purified after synthesis, which usually leads to loss of single-wall carbon nanotubes, or a method must be found that produces an enhanced yield of single-wall carbon nanotubes with a high productivity catalyst. A need remains for a high yield, economically-effective method for producing single-wall carbon nanotubes.

In some end-use applications for single-wall carbon nanotubes, it is desirable to use nanotubes having a particular length distribution. For instance, when blending single-wall carbon nanotubes with liquids, the length distribution of the nanotubes affects the viscosity characteristics of the liquid/nanotube blend. In some end-use applications, a particular distribution of diameters is desired. A method for producing single-wall carbon nanotubes with a particular distribution of lengths and diameters of nanotubes is needed.

SUMMARY OF THE INVENTION

Certain embodiments of the present invention involve a method for rapidly growing high-quality single-wall carbon nanotubes in a high-yield catalytic process that selectively produces single-wall carbon nanotubes with minimal extraneous carbon. In one embodiment, single-wall carbon nanotubes are made by providing a catalyst comprising the catalytic metals iron (Fe) and molybdenum (Mo), and magnesium oxide (MgO) support material, wherein the catalyst has been formed by combusting iron, molybdenum and magnesium oxide precursors. The catalyst is contacted with a gaseous carbon-containing feedstock at a sufficient temperature and for a sufficient contact time to make a carbon product comprising single-wall carbon nanotubes. In one embodiment, the weight ratio of iron and molybdenum can range from about 2 to 1 to about 10 to 1. In another embodiment the molar ratio of iron and molybdenum ranges from about 3 to 1 to about 20 to 1. In yet another embodiment, the weight of the metals on the magnesium oxide particles range from about 0.5 wt % to about 10 wt % of the weight of the magnesium oxide. In yet another embodiment, the carbon-containing feedstock is a hydrocarbon, preferably methane. In another embodiment, hydrogen is added to the carbon-containing feedstock and catalyst in a reactor for making single-wall carbon nanotubes. The method further comprises removing catalyst residues with an acid after the nanotubes have been produced. Suitable acids for the removal of catalyst residues are hydrochloric acid, acetic acid, nitric acid and citric acid, with hydrochloric acid being preferred.

In another embodiment of the present invention, single-wall carbon nanotubes are made by providing a catalyst comprising the catalytic metals cobalt and molybdenum, and magnesium oxide support material, wherein the catalyst has been formed by combusting precursors of cobalt, molybdenum and magnesium oxide, sulfiding the catalyst, and contacting the catalyst with a gaseous carbon-containing feedstock at a sufficient temperature and for a contact time sufficient to make a carbon product comprising single-wall carbon nanotubes.

In another embodiment of the present invention, single-wall carbon nanotubes are made by providing a catalyst of catalytic metal comprising at least one metal from the group consisting of Group VIB and Group VIIIB, wherein the catalyst has been formed by combusting precursors of the catalytic metal and a support precursor, wherein the support precursor produces a support selected from the group consisting of alumina, magnesia, silica, zirconia and combinations thereof, to form the supported catalyst; sulfiding the catalyst, and contacting the catalyst with a gaseous stream comprising a carbon-containing feedstock at a sufficient temperature and for a contact time sufficient to make a carbon product comprising single-wall carbon nanotubes.

In another embodiment, the invention provides a method for growing single-wall carbon nanotubes of different lengths and diameters by controlling variables, including, but not limited to, catalyst composition, catalyst preparation conditions, nanotube growth reaction time, nanotube growth reaction conditions, and combinations thereof.

In another embodiment, the single-wall carbon nanotubes are made with a catalyst and a gas stream comprising a carbon-containing feedstock which is introduced into a reactor having one or more zones wherein the conditions in each zone can be controlled and wherein the catalyst can be dispersed in the gas stream. In another embodiment, the catalyst and a gas stream comprising a carbon-containing feedstock is introduced into a reactor system comprising different reactors, which can be of different types and operated under different conditions, in order to make single-wall carbon nanotubes with the desired properties. The process to make single-wall carbon nanotubes can be done in a batch, semi-continuous or continuous mode of operation.

In one embodiment, the single-wall carbon nanotubes can be made in a continuous mode of operation in a transport reactor. In another embodiment, the single-wall carbon nanotubes can be made in a continuous or semi-continuous mode of operation in a fluidized bed reactor, which can be configured as a fluidized fixed bed or fluidized continuous bed reactor, or a counter-current moving bed reactor. In any reactor, particularly one comprising a fluidized bed, particles of non-catalytic refractory material, that are essentially inert with respect to the feedstock at reaction conditions, can be added to the gas stream in the reactor to facilitate the fluidization and dispersion of the catalyst, as well as heat transfer to and from the catalyst. Such refractory material shall be referred to as a fluidizing aid, a dispersing aid, counter-current particles or essentially-inert particles.

Even though the catalyst and dispersing aid do not form a fluidized bed in a transport reactor, the dispersing aid can also facilitate cleaning or scrubbing of the transport reactor walls. The catalyst and the carbon product comprising single-wall carbon nanotubes have a propensity to stick to the reactor walls and addition of such a material minimizes the catalyst and carbon product sticking and building up on the reactor walls. In other reactor configurations, such as in fluidized bed and moving bed reactors, the fluidizing aid, also known as counter-current particles and essentially-inert particles, not only keeps the catalyst and the carbon product from sticking to the reactor walls, but also keeps the catalyst and attached carbon product dispersed and, as such, minimizes self-aggregation of the catalyst and the carbon product associated with it.

In one embodiment of this invention, single-wall carbon nanotubes are made with little extraneous carbon in a high throughput process that is scaleable for the production of commercial quantities of single-wall carbon nanotubes.

DESCRIPTION OF THE DRAWINGS

FIG. 11A shows RBM Raman shifts for single-wall carbon nanotubes prepared according to Example 4 from a 1-second injection of methane. Raman excitation was provided by a 782-nm diode laser.

FIG. 11B shows RBM Raman shifts for single-wall carbon nanotubes prepared according to Example 4 from a 10-second injection of methane. Raman excitation was provided by a 782-nm diode laser.

FIG. 11C shows RBM Raman shifts for single-wall carbon nanotubes prepared according to Example 4 from a 20-second injection of methane. Raman excitation was provided by a 782-nm diode laser.

FIG. 11D shows RBM Raman shifts for single-wall carbon nanotubes prepared according to Example 4 from a 60-second injection of methane. Raman excitation was provided by a 782-nm diode laser.

DETAILED DESCRIPTION OF SPECIFIC EMBODIMENTS

Figure 1:
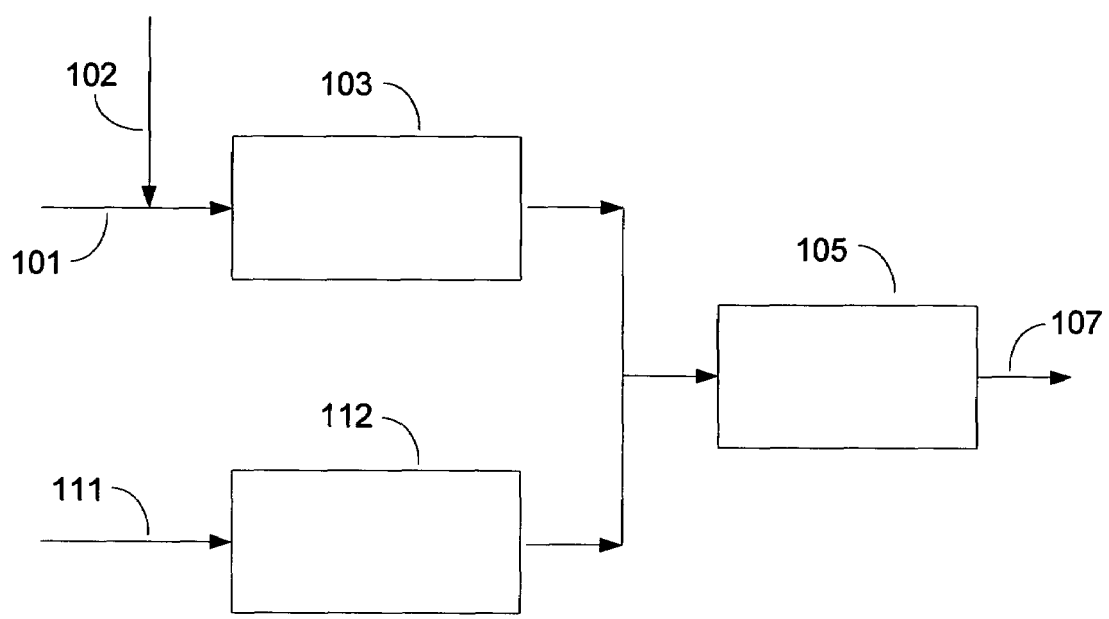
FIG. 1 shows a process flow diagram of a process that uses a transport reactor.

The present invention provides a method for rapidly growing high quality single-wall carbon nanotubes in a high-yield, economically-effective, CVD process that selectively produces single-wall carbon nanotubes with minimal extraneous carbon.

The following definition will apply.

"Catalyst" shall mean the complete catalyst system including all components that make up the system, such as the catalytic metal, compounds of the catalytic metal, the support material, and any other components and/or treatments that might be included in an embodiment. The term "catalyst" and "supported catalyst" are intended to have the same meaning in the present application.

"Catalytic metal", "catalyst metal" or "metal catalyst" shall mean the transition metal that catalyzes the reaction of the carbon-containing feedstock to carbon nanotubes. The catalytic metal is part of the catalyst.

"Support material" is a material that can withstand the reaction temperatures and conditions for making single-wall carbon nanotubes. The support material is part of the catalyst and provides a surface for the catalytic metal to reside upon.

"Fluidizing aids," "dispersing aids" and "counter-current particles" are essentially inert, refractory materials in a particulate form that serve to disperse the catalyst in a reactor configuration and act as heat transfer agents and temperature stabilizers for the nanotube synthesis reaction. Fluidizing aids, dispersing aids and counter-current particles can function as wall scrubbers or cleaning aids to minimize or prevent material comprising the catalyst, the carbon nanotube product and combinations thereof, from sticking to and building up on the reactor walls.

In one embodiment, the single-wall carbon nanotubes are made by providing a catalyst comprising catalytic metals, iron (Fe) and molybdenum (Mo), and magnesium oxide (MgO) support material, wherein the catalyst is formed by combusting precursors of iron, molybdenum and magnesium oxide, and contacting the catalyst with a gaseous carbon-containing feedstock at a sufficient temperature and for a contact time sufficient to make a carbon product comprising single-wall carbon nanotubes.

In one embodiment, the supported catalyst is prepared by combining precursors of the iron, molybdenum and magnesium oxide in a container able to withstand combustion temperatures. Any iron compound that can be combusted to iron oxide is a suitable iron precursor. Examples of suitable iron precursors include, but are not limited to, iron (III) nitrate, iron sulfite, iron sulfate, iron carbonate, iron acetate, iron citrate, iron gluconate, iron hexacyanoferrite, iron oxalate, and tris(ethylenediamine) iron sulfate. Generally, iron salts with high water solubility are preferred. Hydrated iron (III) nitrate is a preferred iron precursor. Any molybdenum compound that can be combusted to molybdenum oxide is a suitable molybdenum precursor. An example of a suitable precursor for molybdenum is ammonium heptamolybdate tetrahydrate. Generally, molybdenum salts with high water solubility are preferred. Any magnesium compound that can be combusted to magnesium oxide is a suitable magnesium oxide precursor. An example of a suitable magnesium oxide precursor is magnesium nitrate. The amount of each precursor is determined such that the weight ratio of iron to molybdenum ranges from about 2 to 1 to about 10 to 1, preferably in the range of about 5 to 1 to about 10 to 1. Preferably, the amount of iron is greater than the amount of molybdenum, on either a weight or a molar basis. On a molar basis, the amount of each precursor can be selected such that the iron to molybdenum mole ratio ranges from about 3 to 1 to about 20 to 1.

The metal loading on the magnesium oxide support is selected to be in a range conducive primarily to the growth of single-wall carbon nanotubes. Metal loading has been defined herein as the percentage of metal weight on the total weight of the support material. The amount of each precursor is also determined such that the total weight of the metal on the magnesium oxide formed in the combustion is in the range of about 0.05 wt % and about 20 wt % of the weight of the magnesium oxide, preferably in the range of about 0.05 wt % and about 10 wt % of the weight of the magnesium oxide, and more preferably in the range of about 0.05 wt % and about 5 wt % of the weight of the magnesium oxide.

The present method of catalyst preparation is not limited to use of the elements specified above. The catalyst support can be any metal oxide that can withstand the conditions present in the growth environment for single wall carbon nanotubes. Such metal oxides include, but are not limited to, alumina ($Al_2O_3$), silica ($SiO_2$), magnesia (MgO), zirconia ($ZrO_2$), and combinations thereof. The catalytic metal can comprise one or a combination of metals from Group VIB transition metals, (chromium (Cr), molybdenum (Mo), tungsten (W)), Group VIIIB transition metals, (e.g., iron (Fe), cobalt (Co), nickel (Ni), ruthenium (Ru), rhodium (Rh), palladium (Pd), osmium (Os), iridium (Ir) and platinum (Pt)), the lanthanide series elements, and actinide series elements.

In another embodiment of the present invention, the catalyst for making single-wall carbon nanotubes can comprise the catalytic metals cobalt and molybdenum, and magnesium oxide support material, wherein the catalyst is formed by combusting precursors of cobalt, molybdenum and magnesium oxide.

In certain embodiments of the present invention, the catalytic metal in the catalyst composition may be present as a metal oxide which is chemically incorporated in the support material. These compositions are sometimes referred to as solid solutions, an example of which is $Fe_xMg_{(1-x)}O_n$, where $0<x<1$, and $0<n<4$.

The catalyst component precursors are combined prior to combustion. Preferably the component precursors are well mixed. The mixing can be done by any mixing means, such as by grinding the components with a mortar and pestle and physically mixing the components. Another way of mixing can be by dissolving the precursors in a small amount water, preferably deionized water, and making a solution of the precursors. Citric acid, urea, glycine, hydrazine, sucrose, carbohydrazide, oxalyl dihydrazide, sugars, alcohols, or a combination thereof, can be used in combustion as foaming promoters. Foaming promoters, also called fuels, are used to increase the surface area of the resulting catalyst. Any foaming promoter can be mixed with the catalyst precursors prior to or after mixing with the water. Preferably, citric acid is added to the catalyst precursors. After combining and mixing the precursors and any foaming promoters, the components are subjected to combustion at a temperature above the combustion temperature of each of the catalyst precursors. Generally, the combustion of the catalyst precursors is conducted by exposing the catalyst precursors to a temperature in the range of about 150° C. and about 1200° C. Typically, the precursors are exposed to combustion temperatures the range of about 200° C. and about 750° C., preferably in a range of about 250° C. and about 650° C. The combustion is conducted in an oxidative environment, preferably in an atmosphere comprising oxygen, such as air. During combustion, the catalyst precursors rapidly foam and form a low bulk density, high surface area solid. In one embodiment, the combustion can be done by preparing a solution of the catalyst precursor components, placing the solution of catalyst precursors in a heated oven, wherein the precursors dry as the solvent evaporates, afterwhich the precursors combust. In another embodiment, the solution of catalyst precursors is sprayed to form an aerosol into a heated chamber, such as a drier, oven or spray drier. The aerosol may be produced by any means of spray-drying, such as, but not limited to, atomization by a flow of gas, direct spraying of the solution through a nozzle, electrostatic spraying, dispersing the solution from the surface of a rotating fixture, and combinations thereof. In another embodiment, the catalyst precursors are combusted by putting the solution of catalyst precursors on a heated surface, whereon the solvent evaporates, and, afterwhich the catalyst precursors combust and the resulting solid material is removed from the surface. Apparatus useful in scale-up combustion done on a heated surface include, but is not limited to, porcupine reactors, drum flakers, wiped-film evaporators and similar process equipment. After combustion, the solid product can be further heated to ensure complete combustion and metal salt decomposition. Generally, about an hour at the combustion temperature is a suitable time. After combustion, the solid, which is generally of low density and high surface area, is cooled. Preferably, the cooling is done in a dry, inert atmosphere, such as provided by a dry nitrogen purge or a desiccator. After cooling, the solid can be ground into a powder. Grinding can be done by any grinding means, such as, for example, a mortar and pestle, ball mills, air mills, grinders, and combinations thereof, to achieve the desired particle size range. After grinding, the catalyst typically has a cross-sectional dimension of less than about 100 microns. The preferred size of the catalyst particle depends on the reactor configuration selected. For example, for some reactor configurations, the preferred catalyst particle size will be less than about 30 microns. The bulk density of the catalyst is typically less than about 0.3 g/cm$^3$, and preferably less than about 0.1 g/cm$^3$.

At this stage, the catalytic metals of the catalyst are assumed to be in oxide form, such as iron oxide and molybdenum oxide on magnesium oxide. In one embodiment, the catalyst in oxide form can be treated with a sulfur-containing compound. The treatment can be done with any sulfur-containing compound, preferably a sulfur-containing compound that is a gas or can be volatilized and contacted with the catalyst in gaseous form. Examples of suitable sulfur-containing compounds are thiophene, hydrogen sulfide, a mercaptan and combinations thereof. Thiophene is a preferred sulfur-containing compound to treat the catalyst. To treat the catalyst with a sulfur-containing compound, the catalyst is loaded into an apparatus wherein the catalyst can be heated and wherein the sulfur-containing compound can pass through the catalyst. For example, a suitable apparatus is a tubular reactor, such as a quartz tube, wherein the reactor is mounted vertically in a tubular furnace and wherein the reactor has a porous frit to position the catalyst in the heated portion of the tubular reactor. Gas, introduced at the bottom of the reactor, passes up through the reactor, through the frit, through the catalyst and exits out through the top of the reactor. With suitable gas flow, the catalyst can be fluidized with the upward flowing gas. In one embodiment, the catalyst in oxide form is treated with a sulfur-containing compound by loading the catalyst into the reactor, purging the reactor containing the catalyst with nitrogen or an inert gas, such as argon, heating the reactor to a temperature, such as to about 500° C., allowing the flow of nitrogen or inert gas to pass through a sulfur-containing compound, such as thiophene in a bubbler, prior to its entry into the reactor, such that the nitrogen or inert gas entering the reactor contains at least some sulfur-containing compound. The gas containing the sulfur-containing compound is then passed into the tubular reactor and through the heated catalyst. The sulfur treatment of the catalyst is conducted at a suitable temperature, such as about 500° C., for a length of time, such as, for example, about 10 minutes.

In an alternate embodiment, the sulfur-containing compound may be added to a gas comprising the gaseous feedstock to form a sulfur-containing compound/feedstock mixture, and this mixture can subsequently be introduced to the reactor under reaction conditions that produce single-wall carbon nanotubes.

If the catalytic metals are in oxidized form, the oxidized catalytic metals can be activated, (i.e. converted to a form in which they provide active catalytic sites for the reaction that forms single-wall carbon nanotubes) by reduction with a reducing agent. This reduction may be done prior to, or concurrent with, contacting the catalyst with the carbon-containing feedstock to make single-wall carbon nanotubes.

In one embodiment, the oxidized catalytic metals are reduced prior to introducing the carbon-containing feedstock to the supported catalyst to make nanotubes. Catalytic metals in the oxidized form (with or without sulfur-treatment) can be reduced in a reactor, such as a tubular reactor. Prior to reduction, the catalyst can be purged with nitrogen or an inert gas, such as argon. Under a purge of nitrogen or an inert gas, the reactor temperature is raised to about 500° C. Catalytic metal reduction is done using a reducing agent such as hydrogen gas or a mixture of hydrogen gas and nitrogen or an inert gas. The catalyst can be treated with a reducing agent for a time sufficient to activate the catalyst, such as, for example, about 10 minutes at 500° C. using a 10% H$_2$ in argon mixture. The reduction time and temperature are inversely related, in that higher reduction temperatures would reduce the catalytic metal in a shorter time. Exposure of the catalyst to long reduction times or high temperatures may cause the catalytic metal to agglomerate into large particles that could catalyze the formation of multiwall carbon nanotubes during nanotube production.

In another embodiment, the catalytic metal oxides are reduced to activate the catalyst during the introduction of the carbon-containing feedstock to the catalyst to make nanotubes. In such a case, the catalyst is loaded into a reactor and purged with nitrogen or an inert gas, such as argon. While under a nitrogen or inert gas purge, the temperature is ramped up to a temperature at which single-wall carbon nanotubes can form. Typically, the temperature for forming single-wall carbon nanotubes is in the range of about 500° C. and about 1500° C. For the present catalyst, the temperature is more typically in the range of about 650° C. and about 950° C., and more typically in the range of about 800° C. and about 950° C. Once the nanotube formation temperature is reached, the gaseous carbon-containing feedstock is introduced to the catalyst. Suitable carbon-containing feedstock gases include, but are not limited to, methane, hydrocarbons, alcohols, carbon monoxide and combinations thereof. Preferably, the gaseous carbon-containing feedstock comprises methane. Introduction of gaseous carbon-containing feedstock to the catalyst at elevated temperatures can reduce the catalytic metal and activate the catalyst. The gaseous carbon-containing feedstock can also be mixed with hydrogen prior to being introduced to the catalyst. Preferably, the gaseous carbon-containing feedstock comprises methane and hydrogen.

Other methods of making the catalyst include, but are not limited to, incipient wetness to impregnate metal-containing compounds on a support material and co-precipitation of metal-containing compounds with support materials or support material precursors. The support material is selected to be able to withstand the elevated temperatures required for single-wall carbon nanotube synthesis. Magnesium oxide is a preferred support material because of its low cost, ease of production, ease of being carried in a gas flow, and ease of removal from the carbon nanotube product.

The catalyst of the present invention can absorb gases, such as carbon dioxide and moisture, from the ambient air. Depending on the exposure time and conditions, the catalyst weight can increase up to about 8 wt % due to adsorbed species that can be desorbed at moderate temperatures, such as between about 100° C. and about 200° C. In certain embodiments, the catalyst support may react with air, and convert some of the support to hydroxide compounds. Such absorbed materials and chemically-modified supports can interfere with the single-wall carbon nanotube growth process. For instance, water vapor from water desorption or decomposition of hydroxides reacts with carbon at elevated temperatures, and as such, could react with and decompose the formed carbon nanotubes. Thus, in one embodiment of this invention, the catalyst is kept under a dry, inert atmosphere, such as nitrogen or argon before being used to make single-wall carbon nanotubes. In another embodiment, the catalyst is dried in a dry, inert atmosphere, such as nitrogen or argon, prior to using it for making single-wall carbon nanotubes. A temperature of 800° C. is suitable for removing most absorbed species from the catalyst.

After preparing the catalyst, the catalyst is contacted with a gaseous stream comprising a carbon-containing feedstock at a sufficient temperature and for a contact time sufficient to make a carbon product comprising single-wall carbon nanotubes. In one embodiment, the gaseous stream also comprises hydrogen. In another embodiment, the contact time for growing single-wall carbon nanotubes is in the range of about 0.1 seconds and about 60 minutes, preferably about 0.1 seconds to about 30 minutes. Shorter growth times, such as those less than 30 minutes, are more conducive for large-scale production of single-wall carbon nanotubes, for example, using contact times in the range of about 10 seconds and about 10 minutes for growing single-wall carbon nanotubes. By varying the contact time, single-wall carbon nanotubes can be grown to different lengths. The contact time and temperature can also affect the diameter of the single-wall carbon nanotubes grown. The growth rate of single-wall carbon nanotubes on the catalyst depends, among other factors, on feedstock type, concentration and temperature. The physical length of single-wall carbon nanotubes grown under conditions appropriate to a specific growth rate depends on the duration of these conditions. Short duration exposure to growth conditions will produce nanotubes that are physically shorter than those produced by long duration exposure. In the present invention, different length distributions of single-wall carbon nanotubes in the carbon product are produced by exposure of supported catalyst to growth conditions for different lengths of time.

Additionally, the contact time, reaction temperature, and composition and pressure of the gas with which the active catalyst is contacted in the reactor also determine the diameter distribution of the single-wall carbon nanotubes formed and the relative amounts of single-wall carbon nanotubes and extraneous carbon produced in the reactor. The relative amounts of carbon-containing feedstock and other gases, such as hydrogen, in the reactor can affect the single-wall carbon nanotube product. For example, more hydrogen in the carbon-containing feedstock reduces the amount of extraneous carbon in the product. Without being limited by theory, the dynamics of carbon nanotube formation appear to be dependent on the concentration and rate of supplying carbon feedstock to the catalyst to form the carbon nanotubes. If the concentration or rate of supplying the feedstock is formation is large, amorphous forms of carbon appear to be preferred over the formation of single-wall carbon nanotubes. Additionally, the rate of forming single wall carbon nanotubes appears to be correlated to the defect level in the nanotube structure. For example, low rates of formation are associated with low levels of defects in the single-wall carbon nanotube structure; when the conditions favor high rates of forming the single-wall carbon nanotubes, then the nanotubes tend to have more structural defects. The rate of forming single-wall carbon nanotubes is dependent primarily on the temperature and the partial pressure of the gaseous feedstock. The partial pressure can be controlled, in part, by adjusting the amount of diluent, such as nitrogen or an inert gas, supplied to the reactor. Addition of oxidizing agents such as very low concentrations of oxygen, water vapor and carbon dioxide also serves to moderate the reaction rate, as well as, minimizes the production of extraneous carbon. However, control of the hydrogen partial pressure in the reactor is particularly effective in establishing control over the rates of nucleation and growth of both single-wall carbon nanotubes and formation rate of extraneous carbon.

Modification of the nanotube nucleation process, in turn, modifies the diameter distribution of single-wall carbon nanotubes formed in the process. Addition of hydrogen or other gases at rates that can vary during the reaction process or addition of such gases at different locations in the reactor enables further control over the relative amounts of single-wall carbon nanotubes and amorphous carbon, as well as control over the diameter distribution of single-wall carbon nanotubes produced.

In yet another embodiment, the diameter distribution of the nanotubes produced is controlled by the conditions during the initiation (or nucleation) of nanotube growth. These conditions include, but are not limited to, nucleation time, temperature, feedstock gas composition and pressure in the region where single-wall carbon nanotube nucleation takes place and reactor configuration. Nanotube nucleation on the catalytic metal carried out under conditions independent from nanotube growth provides greater control over the nanotube diameter.

Contacting the catalyst with a gas or gas mixture for the purposes of catalyst activation and single-wall carbon nanotube nucleation and growth can be done at gas pressures in the range of about 0.1 atmosphere and about 200 atmospheres. Each of the processes may be done at the same or different pressures. After contacting the catalyst with the gaseous stream containing the carbon-containing feedstock and an amount of single-wall carbon nanotubes has been formed, the gaseous carbon-containing feedstock can be turned off and the reactor cooled in a nitrogen or inert gas purge. The carbon product on the catalyst is then removed from the reactor. The single-wall carbon nanotube product forms predominantly on the surface of the catalyst, and it is often desirable in many end-uses to remove the residual catalyst from the nanotube product. As a support material, MgO is particularly desirable, not only because it produces only small amounts of extraneous carbon, but also because it can be easily removed from the final nanotube product by treatment with a mild acid. The catalyst remaining after the reaction process, including magnesium oxide and catalytic metals, can be removed by treating or mixing the carbon product comprising single-wall carbon nanotubes and residual catalyst with an acid, such as, but not limited to, citric acid, acetic acid, nitric acid, sulfuric acid, hydrochloric acid, hydrofluoric acid and combinations thereof. Modest concentrations of these acids are effective in removing the magnesium oxide and much of the catalytic metal. Other acids of higher strength may be used at higher dilution. Suitable acids are citric acid, such as 20 wt % aqueous citric acid, nitric acid and hydrochloric acid, of which, hydrochloric acid is preferred.

After mixing with acid to remove magnesium oxide and catalytic metals, the carbon product is washed repeatedly with water. After washing, the purified single-wall carbon nanotube product can be dried. The present method for making single-wall carbon nanotubes produces little extraneous carbon. In one embodiment, at least about 50 wt % of carbon in the product is single-wall carbon nanotubes. In another embodiment, at least about 80 wt % of carbon in the product is single-wall carbon nanotubes. In yet another embodiment, at least about 90 wt % of carbon in the product is single-wall carbon nanotubes. In yet another embodiment, at least about 95 wt % of carbon in the product is single-wall carbon nanotubes.

Certain applications for the nanotubes may require further purification of the single-wall carbon nanotube product. Further purification can be done by any known means. Procedures for purification of carbon nanotubes are related in International Patent Publications "Process for Purifying Single-Wall Carbon Nanotubes and Compositions Thereof," WO 02/064,869 published Aug. 22, 2002, and "Gas Phase Process for Purifying Single-Wall Carbon Nanotubes and Compositions Thereof," WO 02/064,868 published Aug. 22, 2002, and incorporated herein in their entirety by reference. In one embodiment, the nanotubes are purified by heating at 250° C. in air saturated with water vapor. The heating is done for a length of time so as to oxidize at least some of the non-nanotube carbon, and, may, to some extent, oxidize the metal impurities. The oxidation temperature can be in the range of 200° C. and about 400° C., preferably about 200° C. to about 300° C. The oxidation can be conducted in any gaseous oxidative environment, which can comprise oxidative gases, such as oxygen, air, carbon dioxide, water vapor and combinations thereof. The choice of oxidation temperature depends on the particular oxidative gas and its concentration. The temperature range for oxidative treatment with water vapor and carbon dioxide can range from about 200° C. and about 1200° C. The concentration of the oxidative gases can be adjusted and controlled by blending them with any gas that does not react with single-wall carbon nanotubes, such as nitrogen, an inert gas, such as argon, or combinations thereof. The duration of the oxidation process can range from a few minutes to days, depending on variables, including, but not limited to, the oxidant, its concentration, and the oxidation temperature. After the heating the nanotubes in an oxidative environment, the remaining material comprising single-wall carbon nanotubes is treated with acid to remove metallic impurities and to form a slurry of nanotubes in the acid. The acid can be a mineral acid, an organic acid, or combinations thereof. Examples of acids that could be used to treat and slurry the nanotubes include, but are not limited to, hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, and combinations thereof. The acid used can be a pure acid or diluted with a liquid medium, such as an aqueous and/or organic solvent. Generally, an aqueous solvent is preferred. Concentrated aqueous hydrochloric acid is preferred for removing metallic impurities. After acid treating, the acid and impurities are removed from the nanotubes by rinsing. The nanotubes can be rinsed with water, an organic solvent or a combination thereof and dried. Drying can be done with or without the application of heat, either in a vacuum or a dry gas atmosphere, such as, but not limited to, nitrogen or an inert gas, such as argon.

Many methods for producing single-wall carbon nanotubes using supported catalysts suffer from low production throughput because the processes are batch processes wherein a batch of supported catalyst is inserted into a growth environment, nanotubes are grown, and the batch of nanotubes on the supported catalyst is removed from the growth environment. Generally, continuous or semi-continuous modes of operation can provide higher throughputs and provide a process that can be used for commercial-scale operations.

Although the method for making single-wall carbon nanotubes in the present invention can be made in a batch mode of operation, the method can also be practiced in a semi-continuous or a continuous mode of operation. The continuous and semi-continuous modes of operation include dispersing the catalyst in a gaseous stream comprising a carbon-containing feedstock, making single-wall carbon nanotubes on the catalyst at a suitable temperature and for a suitable length of time, and removing the nanotube product the gaseous stream.

In one embodiment of the invention, the catalyst for growing single-wall carbon nanotubes has a particle size in the range that is suitable for transport through a reactor, typically in the range of about 1 micron and about 1000 microns in diameter. The catalyst is then used in the reactor in a way that the catalyst is carried through the reactor, which may comprise various zones that are maintained at different reaction conditions, each separately optimized for different stages of nanotube initiation and growth. Reaction conditions include, but are not limited to, reaction time, temperature, pressure and concentrations of components of gas in the reactor. Because production of single-wall carbon nanotubes is a multistep process which, for example, can involve reduction of the catalytic metal to activate the catalyst, initiation of nanotube growth, and continuation of the nanotube growth, a reactor having different zones wherein the catalyst is conveyed or transported from one reaction zone to another is desired. In a reactor with one or more zones, the reaction temperature and the gas composition can be adjusted within a zone of the reactor. For example, feedstock gas or other gases, such as hydrogen, catalyst, and/or heat can be added continuously or on-demand in each zone of the reactor.

The residence time of the catalyst in the reactor, i.e., the length of time the catalyst is exposed to one or more different reaction conditions through the reactor, can be controlled by adjusting, among other variables, the flow rate of the gas through the reactor and the reactor configuration. The characteristics of the single-wall carbon nanotube product produced are controlled, by adjusting, among other variables, the residence time of the catalyst in the reactor, the temperature profile, and the composition of the gaseous stream comprising the carbon-containing feedstock. The product characteristics include, but are not limited to, the relative amounts of extraneous carbon and single-wall carbon nanotubes, and the length and diameter of the nanotubes.

Transporting the catalyst through the reactor provides a scalable, high-volume nanotube production process in which catalyst is continuously introduced at one point in the reactor system and product comprising single-wall carbon nanotubes is removed continuously at another point. This continuous scheme for CVD production of single-wall carbon nanotubes can be done in a production plant comprising a catalyst formation section, a reactor section, and a post-processing section joined together in a single plant. After the post-processing section, other modifications to the product can be done, such as, but not limited to, oxidative treatment of the product, removal of the catalyst support and catalytic metal residues, chemical modification of the nanotubes, physical modification of the nanotubes, blending or mixing the nanotubes with other materials, and combinations thereof.

The catalyst can be transported through a reactor for making single-wall carbon nanotubes by mechanical means, such as by screws or conveyors, however, entrainment in a gaseous stream comprising a carbon-containing feedstock is a preferred means of transport. To transport the catalyst by entrainment in a gaseous flow, the catalyst particles are made into sufficiently finely-divided particles of a size that can be transported in a gas flow in the reactor. The catalyst is introduced at one point in the reactor, and carried through a number of zones. At least one zone will provide reaction conditions for the growth of single-wall nanotubes and other zones may include one or a combination of a nucleation zone where growth of the single-wall carbon nanotubes is initiated, other nanotube growth zones, and a recovery zone where the product is removed from the gaseous stream comprising unreacted feedstock, byproduct gases and transport gases exiting the reactor. Removal of the carbon product from the gaseous stream can be done by collecting the product on a filter which is permeable to the gaseous stream exiting the reactor. The product can also be removed from the gaseous stream exiting the reactor by other means of gas-solid separation, such as, but not limited to, a cyclone, wet scrubber, electrostatic precipitation, bag collection, and combinations thereof.

In one embodiment of the present invention, the size of the catalyst particle is selected in order to be easily entrained in a flowing gas so as to effectively grow single-wall carbon nanotubes. For certain reactor designs, the catalyst particle can be less than about 100 microns in cross sectional dimension and others, less than about 30 microns in cross sectional dimension. For some reactor conditions, the optimal-sized particles can be made by aggregating smaller particles to a size sufficient for effective reactor operation, such as in a fluidized bed or fluidized suspension. Particle aggregation can be done by various means, such as by physical aggregation, compression, pelletization, extrudation and combinations thereof. Particle aggregation can be done with or without a binder material, such as a hydroxide of the metal whose oxide forms the catalyst support.

In one embodiment of this invention, a gas stream comprising a gaseous carbon-containing feedstock transports the catalyst through one or more zones or sections of a reactor wherein each zone has controls for adjusting the conditions for single-wall carbon nanotube production. In another embodiment, the reactor is configured so that essentially-inert, non-catalytic refractory particles are optionally added to the reactor. These non-catalytic particles can provide for a more uniform dispersion of the catalyst within the flowing gas, maintain a clear path for the flow of catalyst, minimize the sticking and buildup of catalyst and nanotube product on the reactor walls, provide thermal stability (i.e. by providing a heat reservoir or heat sink for endothermic or exothermic reactions, respectively), and facilitate heat transfer between the catalyst and the reactor walls. Examples of materials for such essentially-inert, non-catalytic particles include, but are not limited to, sand, quartz, ceramic, metal oxides, carbides, silicas, silicides, the support material, and other materials that facilitate a generally uniform dispersion of the catalyst throughout the diameter of the reactor. The reactor pressure, flow path length and orientation can be varied to optimize the production of single-wall carbon nanotubes. Suitable reactor pressures are in the range of about 0.1 and about 200 atmospheres, and suitable flow path lengths are in the range of about 1 and about 1000 feet. Preferably, the reactor is oriented vertically.

In one embodiment, single-wall carbon nanotubes can be in a continuous mode of operation in a transport reactor, such as diagrammed in FIG. 1. In this embodiment, a supply of a transport gas 101 is provided. The transport gas is also called a carrier gas, and typically comprises nitrogen or an inert gas, such as argon, and can, optionally, include hydrogen and/or feedstock gas. A supply of supported catalyst 102 is also provided. The transport gas 101 entrains some of the catalyst to form a catalyst/transport gas mixture which is preheated in a catalyst/transport gas heating section 103 to approximately the temperature of the heated transport reactor 105. A separate stream of a gaseous carbon-containing feedstock 111 is supplied and preheated in a feedstock heating section 112 to about the temperature of the transport reactor 105. The heated catalyst/transport gas mixture and heated gaseous carbon-containing feedstock are supplied to a transport reactor 105 which is heated to a temperature sufficient to form single-wall carbon nanotubes from the carbon-containing feedstock on the catalyst. The flow through the transport reactor is generally plug flow. The reactor can have multiple zones wherein each zone is capable of maintaining a different set of reaction conditions, such as, but not limited to temperature, pressure and feedstock composition. To adjust the feedstock composition in the reactor 105, the reactor can include injection ports along its length in order to introduce more carbon-containing feedstock, hydrogen or a combination thereof. The residence time in the reactor is determined by the total gas flowrate, and the diameter and length of the transport reactor 105. After sufficient reaction time in the transport reactor 105, the composition 107 exiting the reactor comprises solid nanotube product on used catalyst, any unreacted gaseous feedstock and the transport gas. The composition 107 exiting the reactor is directed to a nanotube recovery area (not shown), wherein the used catalyst and non-nanotube carbon are separated from the single-wall carbon nanotubes. The reactor can further comprise a solid-gas separator, a disengaging section, a wet scrubber, a cyclone, an electrostatic precipitator, a filtration assembly, or combinations thereof. Further purification of the single-wall carbon nanotubes can be done, as desired, for the end-use application.

In another embodiment, the catalyst can be suspended and fluidized in an up-flowing gas in one or more sections of the reactor through fluidization, for example, such as in a fluidized bed reactor. The catalyst particle size is selected to facilitate fluidization of the catalyst and is generally of a cross-sectional dimension between about 30 microns and about 1000 microns. Catalyst fluidization, dispersion and retention in a fluidized bed can be facilitated via introduction of an optional fluidizing aid, which is in the form of essentially-inert, non-catalytic refractory particles that are generally denser than the catalyst particles and able to be fluidized in a gaseous flow in the fluidized bed reactor. By "essentially-inert" is meant that the material is generally non-reactive with the feedstock at the reactor conditions for making single-wall carbon nanotubes. The essentially-inert, non-catalytic particles can be the same material as the catalyst support, or could be a different material such as sand, quartz beads, ceramic beads, metal oxides, carbides, silicas, silicides, another refractory material, or combinations thereof. These essentially inert particles, also called "fluidizing aids" herein, can be fluidized in one or more zones of a fluidized bed reactor and can withstand the conditions within the reactor. The catalyst itself can be fluidized with or without a fluidizing aid, however because catalyst is generally very light and of very low density, the presence of a fluidizing aid is preferred. The fluidizing aid itself assists in formation of a fluidized bed in the gaseous flow and promotes a uniform dispersion of the catalyst in the fluidized bed. It helps maintain a constant temperature in the reaction by serving as a heat sink or reservoir to maintain temperature stability for either exothermic or endothermic reactions and serves as a heat transfer agent with the reactor walls. It also acts as a reactor wall scrubber by keeping the reactor walls clean from catalyst and nanotube product that can stick and buildup on the walls. Generally, the preferred fluidizing aid is one that is resistant to attrition during fluidization in the reactor In one embodiment, in which a fluidizing aid is used in a fluidized bed configuration, the catalyst particles are introduced near the bottom of the reactor and migrate into the fluidizing bed comprising the fluidizing aid, wherein the catalyst particles become well dispersed. In this embodiment, the actual volume occupied by catalyst is less than that occupied by the fluidizing aid. The volume ratio of fluidizing aid to catalyst is between about 1000:1 and about 1:1 (fluidizing aid volume:catalyst volume). Depending on the relative amounts of catalyst and fluidizing aid, the catalyst may migrate through the fluidizing aid and form a separate bed on top of the fluidizing aid bed. The catalyst residence time in the fluidizing aid provides the catalyst with a reaction environment where the temperature is uniform, and where it is in intimate contact with the heat source or sink provided by the fluidizing aid. This thermal contact with the fluidizing aid is conducive to establishing good control over the single-wall carbon nanotube synthesis reaction processes, which can be highly endothermic or exothermic. If the reaction temperature is not maintained, the reaction for forming the single-wall carbon nanotubes will be affected. Thus, maintaining stable reaction conditions requires that the catalyst be in good thermal contact with its immediate environment. The fluidizing aid, which is in intimate contact with the reactor walls, exchanges heat with the walls and will transfer that heat to or from the reacting catalyst. The heat transfer between the fluidizing aid and the catalyst takes place where the catalyst is mixed with the fluidizing aid and also takes place at the interface between any separate fluidized beds of catalyst and fluidizing aid that may form. For a given amount of catalyst, this embodiment substantially enhances the heat transfer between the reactor walls and the catalyst. This enhanced heat transfer is obtained, in a large part, because the wall contact area of the fluidized bed comprising fluidizing aid is substantially larger than the wall contact area of a bed of the catalyst alone (for the catalyst-to-fluidizing aid ratios of this embodiment). This wall area is a major factor in determining the heat transfer rate between the reacting catalyst and the reactor wall; furthermore, the fluidizing aid can be chosen to have heat transfer characteristics at the wall that exceed those of the catalyst interacting with the wall. Additionally, heat is transferred to and from the fluidizing aid by its contact with the gases flowing through the reactor. Through the intimate contact between the catalyst and the fluidizing aid, heat from the gases is then transferred to or from the reacting catalyst, further stabilizing its temperature. The heat transfer between the gases flowing through the reactor and the catalyst is further enhanced by the action of the fluidizing aid in keeping the catalyst well dispersed so that the catalyst itself is in better contact with the flowing gases than it would be in the absence of the fluidizing aid. The temperature-controlling role of the fluidizing aid as a heat transfer agent and heat transfer enhancer is particularly important for single-wall carbon nanotube production reactions that are highly exothermic or endothermic.

In one embodiment, the catalyst may be subjected to a separate reducing environment wherein the catalytic metal is reduced to activate the catalyst prior to being used in the fluidized bed. In another embodiment, the gaseous feedstock for the carbon nanotubes, such as methane, can be used to reduce the oxide form of the catalytic metal on the catalyst to activate the catalyst in situ.

In one embodiment single-wall carbon nanotubes are made with a catalyst fluidized in a fluidized bed reactor so that gas flows uniformly through the bed comprising the catalyst. This bed is maintained at a temperature suitable for single-wall carbon nanotube growth and gas comprising the gaseous feedstock is passed through the catalyst to fluidize it and, at the same time, reacts on the catalyst to produce single-wall carbon nanotubes.

Figure 2:
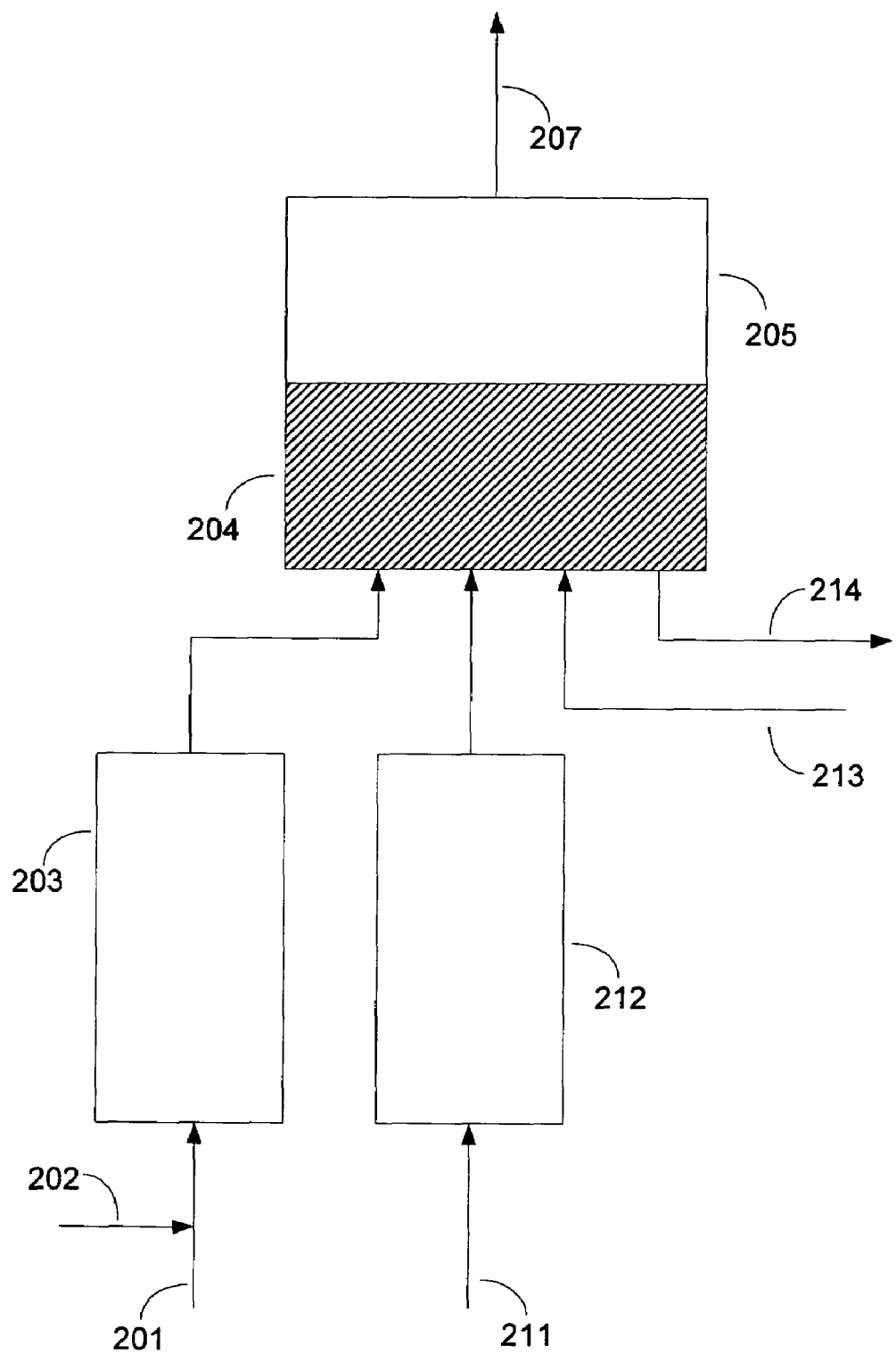
FIG. 2 shows a process flow diagram of a process that uses a fluidized fixed bed reactor.

An example of one embodiment of a fluidized bed reactor is diagrammed in FIG. 2. This method of operation, a fluidized fixed bed reactor, is an example of a semi-continuous mode of nanotube production. In this reactor, the amount of fluidized particles, such as the catalyst and any fluidizing aid, is a fixed amount or batch, while a gas stream is fed continuously to the reactor to keep the bed fluidized. In this type of process, when the reaction is over, the reacted catalyst with associated nanotube product is discharged batch-wise. The particles of fluidizing aid can also be changed out or regenerated, as applicable, in a batch-wise fashion. Alternatively, multiple reactors with fluidizing aid can be used, such that, after one reactor needs cleaning or refurbishing, another one can be put on-line.

In one embodiment of the method, a supply of a transport gas 201 is provided. The transport gas is also called a carrier gas, and typically comprises nitrogen or an inert gas, such as argon, but can also include a small amount of hydrogen or feedstock gas. A supply of a supported catalyst 202 is also provided. The transport gas 201 entrains some of the catalyst to form a catalyst/transport gas mixture which is preheated in a catalyst/transport gas heating section 203 to approximately the temperature of the heated fluidized bed reactor 205. A separate stream comprising a gaseous carbon-containing feedstock 211 is supplied and preheated in a feedstock heating section 212 to about the temperature of the fluidized bed reactor 205. Besides acting as the carbon source for forming single-wall carbon nanotubes, the carbon-containing feedstock 211 also serves to fluidize the particles in the fluidized bed. The heated catalyst/transport gas mixture and heated gaseous carbon-containing feedstock are supplied to the fluidized bed reactor 205. In the fluidized bed reactor, the fluidized bed 204 is present in a portion of the reactor 205. The particles that are fluidized in the fluidized bed 204 comprise the catalyst and, optionally, any fluidizing aids, including, but not limited to, ceramic beads, quartz beads, refractory particles and combinations thereof. In the fluidized bed reactor 205, heated to a temperature sufficient to form single-wall carbon nanotubes, the carbon-containing feedstock enters the reactor 205, serves to fluidize the catalyst and any particles in the reactor, reacts on the catalyst to form a carbon product comprising single-wall carbon nanotubes, and any unreacted feedstock and gaseous reaction product leaves the reactor exit 207. The contact time of the carbon-containing feedstock and the catalyst can be selected by adjusting the time that the carbon-containing feedstock is present with the catalyst. After sufficient contact time to make single-wall carbon nanotubes, the feedstock gas is shut off and a purge gas 213, such as nitrogen or an inert gas, is introduced to purge out the carbon-containing feedstock and, optionally, cool the used catalyst and nanotube product. Subsequent to completion of the reaction process, the purge gas rate is increased so as to blow the less dense and lighter catalyst and nanotube product out of the reactor exit 207. After exiting the reactor, the solid nanotube product and used catalyst can be separated and the single-wall carbon nanotubes purified, as needed, for the particular end-use application. Any heavier particles, such as ceramic beads, used as a fluidizing aid, would not be blown out of the reactor with the nanotube product and used catalyst. This separation of fluidizing aid and product is referred to as differential elutriation, as the less dense particulate material (the catalyst and product) is carried out of the reactor (elutriated) by the gas flow, while the more dense material (the fluidizing aid) remains in the reactor. Instead, such heavier, denser particles could be drained through a bottom port of the reactor 214, wherein the port would be opened after the nanotube product and catalyst were removed by blowing overhead and out of the reactor exit 207. The heavier, denser particles could be cleaned or replaced for use with another batch of catalyst.

In a fluidized bed, the catalyst can be changed out batch-wise, such as in a fluidized fixed bed reactor. In a continuous fluidized bed arrangement or a counter-current moving bed reactor, fresh catalyst is constantly being added and reacted catalyst with nanotube product is removed so that the rate of addition and subtraction approaches steady-state operation.

Figure 3:
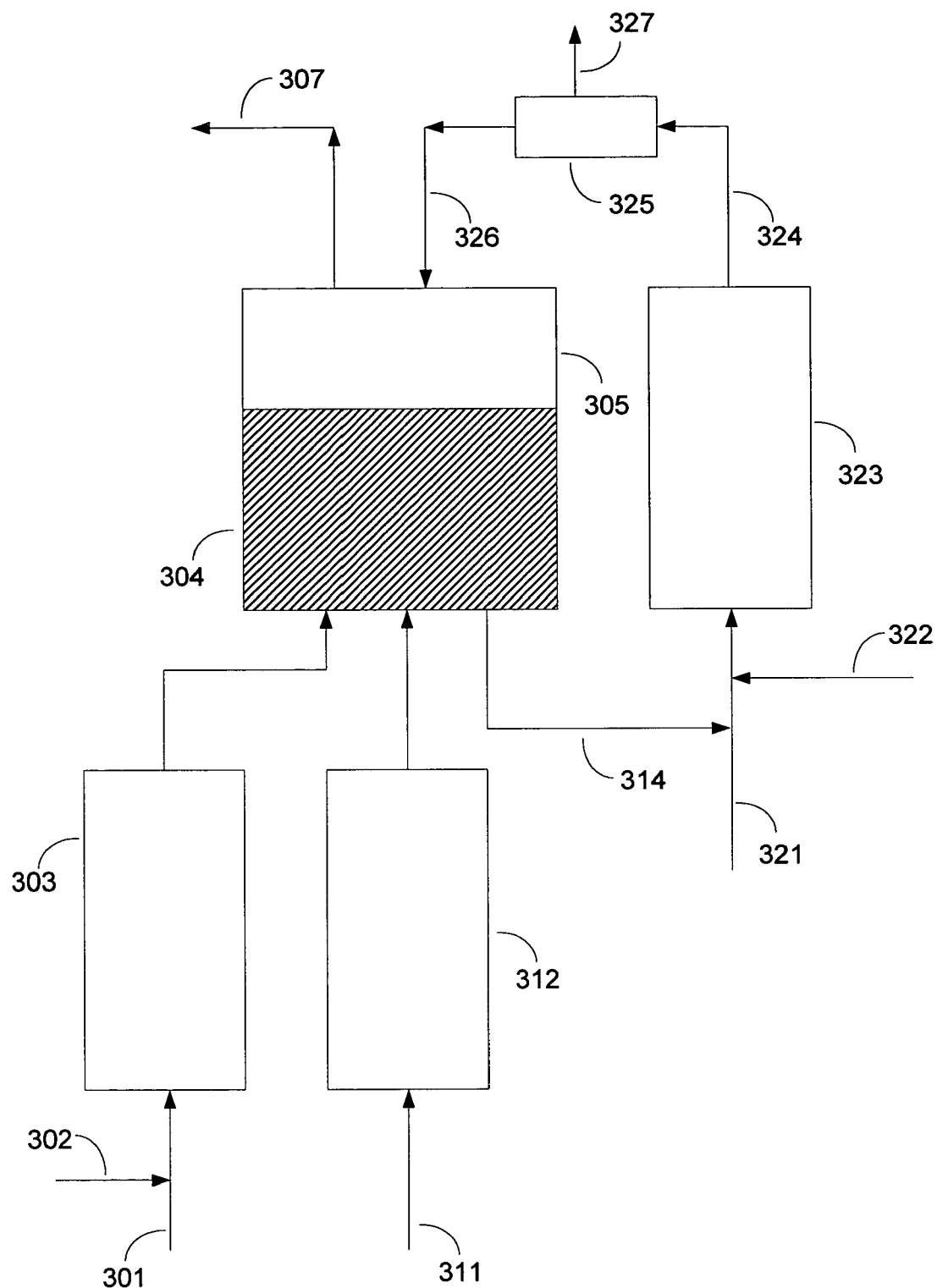
FIG. 3 shows a process flow diagram of a process that uses a counter-current moving bed reactor.

In another embodiment, single-wall carbon nanotubes can be made in a continuous mode in a counter-current moving bed reactor, such as diagrammed in FIG. 3. In this embodiment, the process is a continuous process wherein both the catalyst/transport gas mixture and the gas stream comprising the carbon-containing feedstock are introduced continuously to the reactor. Particles of essentially-inert material, such as those materials used as fluidizing aids, are circulated counter-current to the catalyst and the feedstock. Note, in a counter-current moving bed reactor, the inert particles moving counter to the catalyst may not be fluidized as in a truly fluidized bed. In a moving bed reactor, an amount of catalyst is continuously being fed to the reactor, while at the same time, a comparable amount of catalyst with nanotubes is removed at a rate set such that the reactor operates in a fashion that approximates steady-state conditions. Simultaneously, an amount of generally-inert particles, called "counter-current particles" herein, are added that move through the reactor in a direction counter to the flow of the catalyst and gaseous feedstock and exit the reactor at the same rate as the particles are added. For example, when feedstock and catalyst form an upward flowing stream in a vertical reactor, the counter-current particles are added from an upper portion of the reactor and can move counter to the catalyst and feedstock flow by gravity. A carbon-containing feedstock is fed continuously to the reactor at such a rate selected to achieve the desired nanotube growth by the time the nanotubes and used catalyst exit the reactor. Simultaneously, counter-current particles, comprising essentially-inert material like the aforementioned fluidizing aids, such as, but not limited to, ceramic beads, quartz beads or other refractory material, are recycled through the steps of: adding to the moving bed, withdrawing from the moving bed, regenerating the particles (i.e. decoking and heating), and returning to moving bed. In the method, a supply of a transport gas, or carrier gas, 301 is provided. The transport gas typically comprises nitrogen or an inert gas, such as argon, but can also include some hydrogen or feedstock gas. A supply of a supported catalyst 302 is also provided. The transport gas 301 entrains some of the catalyst to form a catalyst/transport gas mixture which is preheated in catalyst/transport gas heating section 303 to approximately the temperature of the heated, moving bed reactor 305. A separate stream of a gaseous, carbon-containing feedstock 311 is supplied and preheated in a feedstock heating section 312 to about the temperature of the moving bed reactor 305. Besides acting as a carbon source for forming single-wall carbon nanotubes, the carbon-containing feedstock 311 flows upward to counter the gravitational flow of the downward-moving counter-current particles. Depending on the density of the counter-current particles and the velocity of the upward-flowing gases, the counter-current inert particles may undergo some fluidization. The heated catalyst/transport gas mixture and heated gaseous carbon-containing feedstock are supplied to the moving bed reactor 305. In the reactor 305, the moving bed 304 is present in a portion of the reactor. In the reactor 305, heated to a temperature sufficient to form single-wall carbon nanotubes, the carbon-containing feedstock enters the reactor 305, reacts with the catalyst to form a carbon product comprising single-wall carbon nanotubes, and the unreacted carbon feedstock, reaction byproducts, and transport gas leaves at the reactor exit 307. The contact time of the carbon-containing feedstock and the catalyst can be selected by adjusting the rate at which the catalyst with nanotubes is withdrawn from the reactor and fresh catalyst is added. The catalyst, which is generally smaller in size and of lower density than the counter-current particles, even though introduced into the bottom of reactor 305, will migrate to the top of the heavier counter-current particles and form a separate layer on top of the counter-current particles where it can leave the reactor at the reactor exit 307.

After exiting the reactor, the solid nanotube product and used catalyst can be separated from the gases exiting the reactor and from each other. The single-wall carbon nanotubes can also be purified, as needed, for the particular end-use application.

The counter-current particles are not blown out of the reactor with the nanotube product and used catalyst. Instead, such heavier, denser particles could be drained through a bottom port of the reactor 314, wherein the port would be continuously open to allow for a fraction of the counter-current particles to be withdrawn from the reactor 305, regenerated, heated and recycled back to the reactor. In the regeneration of the fluidizing aid, an air stream 321 is provided. The air stream 321 and the counter-current particles from the bottom port of the reactor 314 combine with a fuel source 322 and together enter a heated decoking unit 323. The emissions 324 from the decoking unit comprise the decoked fluidizing aid and combustion products. These emissions 324 are fed to a separator 325 where the combustion products 327 are separated and removed from the cleaned and heated counter-current particles which are returned to the moving bed reactor 305 through port 326. The recycling and regeneration of the counter-current particles are done at a steady-state rate related to the coking rate of the particles or to maintain heat stability in the nanotube synthesis reaction. The counter-current particles circulating through the decoking unit also provide heat as they are returned to the reactor. This transferred heat is useful in maintaining reactor temperature when the nanotube-producing reaction is endothermic. One aspect of this invention is use of counter-current particles as heat transfer agents, where they take heat from one portion of the reactor to another.

Figure 4:
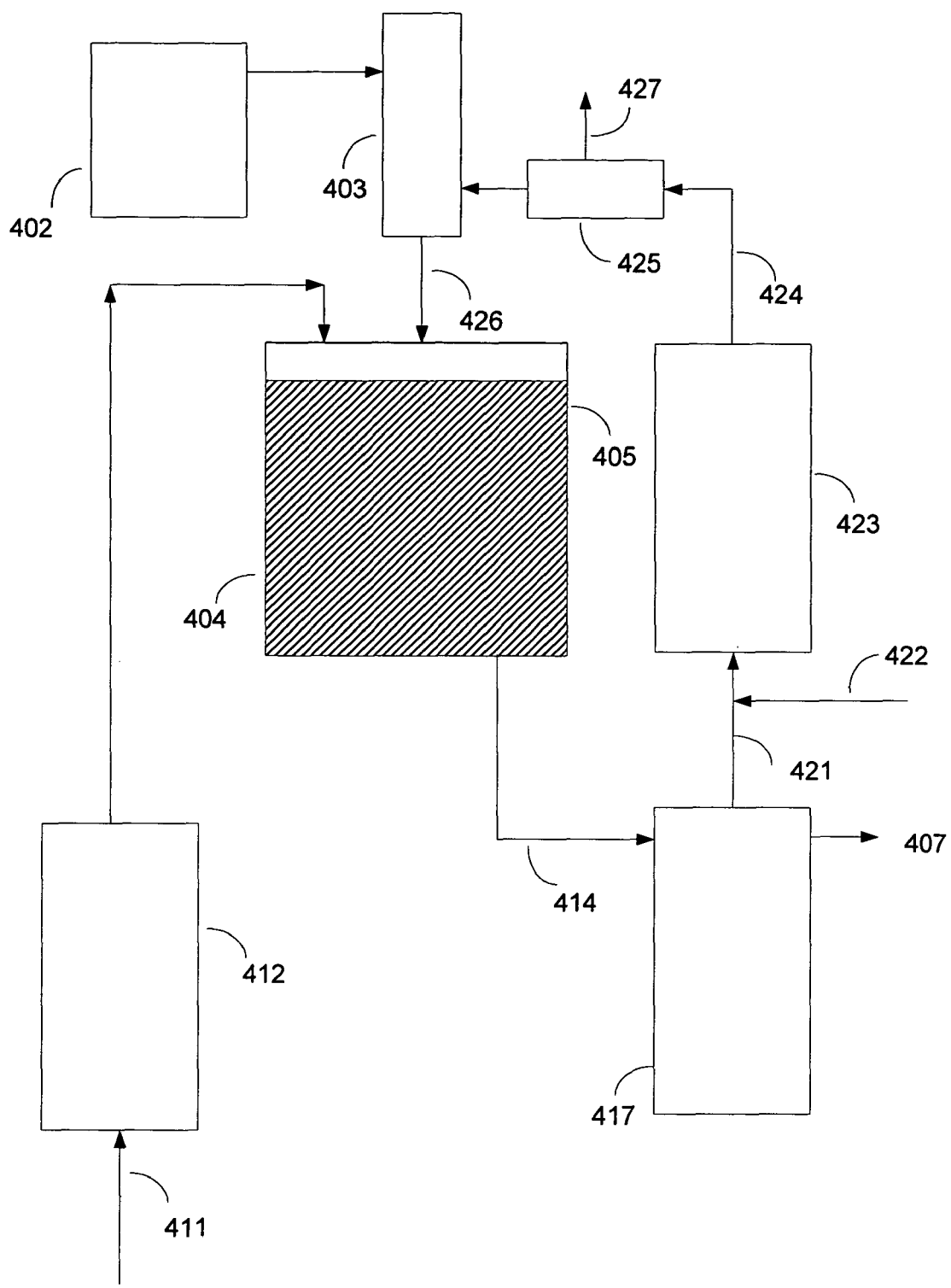
FIG. 4 shows a process flow diagram of a process that uses a concurrent-flow moving bed reactor.

In another embodiment, single-wall carbon nanotubes can be made in a continuous manner in a concurrent-flow moving bed reactor, such as diagrammed in FIG. 4. In this embodiment, both the catalyst/transport gas mixture and the gas stream comprising the carbon-containing feedstock are introduced continuously to the reactor. Particles of essentially-inert material, such as those used as fluidizing aids, are circulated in a direction concurrent with the catalyst and the feedstock. In this embodiment, the catalyst flows in the same direction as the essentially-inert particles. The mixture of the catalyst and essentially-inert particles may not be completely fluidized as in a truly fluidized bed, the action of flowing through the reactor induces some circulation of the mixture. In this reactor, catalyst and inert particles are continuously being fed to the reactor, while at the same time, a comparable amount of catalyst with nanotubes is removed along with essentially-inert particles at a rate set such that the reactor operates in a fashion that approximates steady-state conditions. A carbon-containing feedstock is fed continuously to the reactor at such a rate selected to achieve the desired nanotube growth by the time the nanotubes and catalyst exit the reactor. The essentially-inert particles are similar to those described above as fluidizing aids, and can comprise essentially-inert material, such as, but not limited to, ceramic beads, quartz beads or other refractory material. The essentially-inert particles are recycled through the steps of: adding to the moving bed, withdrawing from the moving bed, separating the product from the essentially-inert particles, regenerating them (i.e. by decoking and heating), and returning them to the moving bed. A supply of supported catalyst in a vessel 402 is provided and transported to a mixing zone 403 by way of a transport gas, gravity flow, screw feeder or other methods for transporting particulate solids. The mixing zone 403 is heated to approximately the temperature of the heated, moving bed reactor 405. A separate stream of a gaseous, carbon-containing feedstock 411 is supplied and preheated in a feedstock heating section 412 to about the temperature of the moving bed reactor 405. The carbon-containing feedstock 411 is the source of carbon for the carbon nanotubes formed in the reactor and flows in the same direction through the reactor as the catalyst and the essentially-inert particles. The heated mixture of catalyst and essentially-inert particles flow through port 426 and the heated gaseous carbon-containing feedstock are supplied to the moving bed reactor 405. In the reactor, the moving bed 404 is present throughout most of the reactor volume. The reactor 405 is heated to a temperature sufficient to form single-wall carbon nanotubes. The carbon-containing feedstock enters the reactor, reacts with the catalyst to form a carbon product comprising single-wall carbon nanotubes, and the unreacted carbon feedstock, reaction byproducts, and any transport gas used leave at the reactor through connection 414 and is introduced to a separator 417. The separator 417 separates the more dense fluidizing aid from the less dense catalyst and nanotube product, directing the essentially-inert particles through connection 421, and the product and catalyst through 407. The separator is a device such as a cyclone, a classifier, or other device known to separate solids. The contact time of the carbon-containing feedstock and the catalyst can be selected by adjusting the rate at which the catalyst with carbon product and essentially-inert particles are withdrawn from the reactor and fresh catalyst and essentially-inert particles are added.

After exiting the reactor, the solid carbon product and used catalyst can be separated from the gases exiting the reactor and from each other. The single-wall carbon nanotubes can also be separated from the carbon product and purified, as needed, for the particular end-use application.

The essentially-inert particles are regenerated, heated and recycled back to the reactor. In the regeneration of the essentially-inert particles, the particles leaving the solids separator in connection 421 combine with a fuel source 422 and together enter a heated decoking unit 423. The emissions 424 from the decoking unit comprise the decoked inert particles and combustion products. These emissions 424 are fed to a separator 425 where the combustion products 427 are separated and removed from the cleaned and heated essentially-inert particles which are returned to mixing zone 403, where they are mixed with fresh catalyst, and the mixture is returned to the moving bed reactor 405 through connection 426. The recycling and regeneration of the essentially-inert particles are done at a steady-state rate to promote heat stability in the nanotube synthesis reaction. The essentially-inert particles circulating through the decoking unit provide heat as they are returned to the reactor. This transferred heat is useful in maintaining reactor temperature when the nanotube-producing reaction is endothermic.

One aspect of the invention is use of inert particles as heat transfer agents, where they take heat from one portion of the reactor to another, wherein that heat provides some of the heat needed for endothermic nanotube synthesis reactions. In alternate embodiments, the gaseous feedstock is introduced at other points in the reactor, including at the bottom of the reactor. Introduction of heated gaseous feedstock at multiple points in the reactor serves to control the progress of the reaction as the catalyst and the essentially-inert particles flow through the reactor.

The present method for making single-wall carbon nanotubes can be practiced in various reactor conditions, such as in a batch, semi-continuous (repeated batches) or a completely continuous process where product is continuously removed from the reactor. Although a continuous process is preferred, the examples given below demonstrate the effectiveness of the invention in batch processes using a catalyst that is suitable for single-wall carbon nanotube growth and made at a density appropriate for use in a variety of reactor configurations, including, but not limited to transport reactors, fluidized bed reactors, counter-current moving bed reactors and combinations thereof.

While the method of this invention is directed toward the manufacture of single-wall carbon nanotubes, the method could, with different catalyst compositions, reaction times and reaction temperatures, be applied to produce multiwall carbon nanotubes, as well.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

CoMo/MgO catalyst was prepared by a wet mechanical mixing and combustion synthesis using the formulation of Tang et al. (*Chemical Physics Letters*, 350 (2001) pp. 19-26). 10 g magnesium nitrate hexahydrate $Mg(NO_3)_2 \cdot 6H_2O$ (Mol. Wt. 256.41), 0.6 g cobalt nitrate hexahydrate $Co(NO_3)_2 \cdot 6H_2O$ (Mol. Wt. 291.04), 0.073 g ammonium heptamolybdate tetrahydrate (also known as ammonium paramolybdate or "Molybdic acid") $(NH_4)_6Mo_7O_{24} \cdot 4H_2O$ (Mol. Wt. 1235.86), and 4 g anhydrous citric acid HOC$(CH_2CO_2H)_2CO_2H$ (Mol. Wt. 192.12) were mixed with 5 ml water by mortar and pestle. The resulting mixture was transferred to a 500-ml beaker and placed in a high temperature furnace preheated at 550° C. Instantaneously, the solution foamed and a large quantity of pink-colored fluffy flakes filled up the beaker. The flakes of catalyst were kept in the furnace for 60 minutes until no trace of black carbon ash was observed. The catalyst was then removed from the high temperature furnace and cooled in a desiccator. To put the catalyst in a useful form for nanotube synthesis, the fluffy flakes were readily ground by mortar and pestle to fine pink powder having a bulk density of approximately 0.1 g/cm$^3$.

1 gram CoMo/MgO catalyst was placed in a fluidized bed reactor. The reactor comprised a 122-cm long quartz tube (2.3-cm O.D., 2.1-cm I.D.) fitted with a quartz frit in the middle to hold the catalyst bed in position in the vertically-oriented reactor. The reactor was placed vertically in a high temperature tubular furnace and gases were supplied at atmospheric pressure to the bottom of the reactor tube. The gas flow was upward through the reactor, through the frit, through the catalyst bed, and out the top of the reactor to an exhaust vent.

The reactor was first purged with argon gas. The reactor temperature was raised to 900° C. at a rate of 20° C./min. During the heating step, adsorbed gases such as water and carbon dioxide desorb from the catalyst. After the target temperature of 900° C. was reached, the argon flow was stopped and methane ($CH_4$) was introduced for 10 minutes. After the methane introduction, the reactor was cooled to room temperature under an argon purge. After cooling, the resulting material retrieved from the reactor was a dark black powder. A few milligrams of the product was suspended in ethanol with ultrasonic aid. A few drops of the suspension were deposited on a holey carbon grid for analysis using transmission electron microscopy (TEM). After the ethanol dried, the product was examined by using a JEOL Model JEM2010 TEM with an electron beam energy of up to 100 kV. The TEM images showed individual single-wall carbon nanotubes and "ropes" of single-wall carbon nanotubes together with a considerable amount of multiwall carbon nanotubes. Such "ropes" are bundles of single-wall carbon nanotubes that are aggregated together and generally aligned in parallel along their individual axes.

EXAMPLE 2

This example demonstrates the preparation of single-wall carbon nanotubes using a catalyst with a lower metal loading using the preparation procedures of Example 1.

0.25 g cobalt nitrate hexahydrate, 0.0365 g ammonium heptamolybdate tetrahydrate, 10 g magnesium nitrate hexahydrate, and 4 g anhydrous citric acid were dissolved with 10 ml deionized water in a 500-ml beaker. When the solution was clear, the beaker was placed in a high temperature furnace preheated to 650° C. A sudden drop in furnace temperature was observed. Almost immediately, the solution foamed and a large quantity of pink fluffy flakes filled the beaker. The furnace temperature was lowered to 550° C. and held for 60 minutes. The catalyst was retrieved from the furnace and placed in a desiccator. The catalyst flakes were readily ground by mortar and pestle to a fine flowing powder. The ground catalyst powder had particle size of less than about 5 μm and a bulk density of about 0.1 g/cm$^3$. The chemical composition of the resulting catalyst was: 2.2:0.53:100 Co:Mo:Mg on a molar basis and 3.2:1.3:100 Co:Mo:MgO on a weight basis. The catalyst is able to absorb carbon dioxide and moisture, and depending on the storage time and exposure, the catalyst can lose up to 8 wt % adsorbed species at 800° C. in air.

Figure 5:
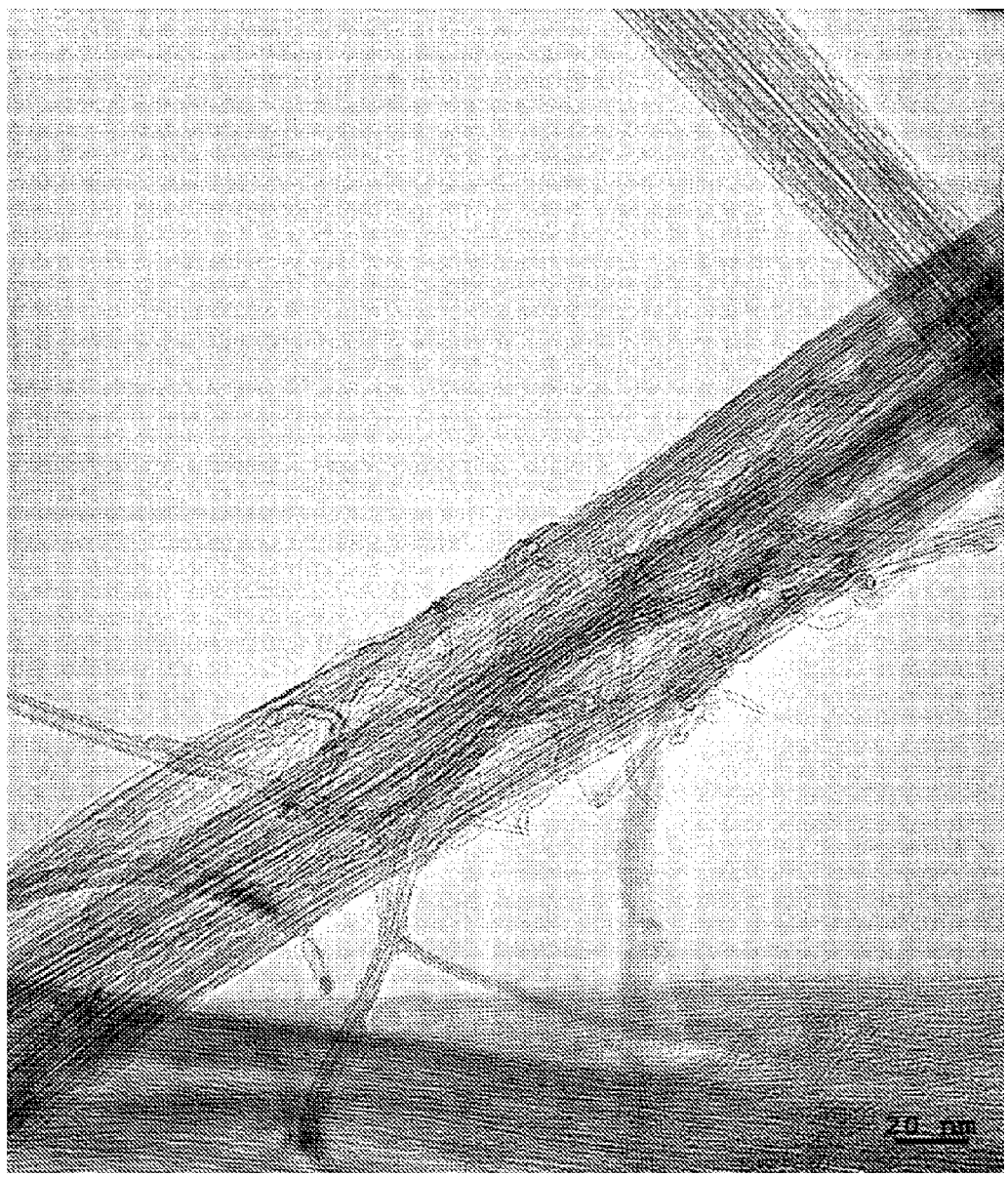
FIGS. 5 and 6 show transmission electron micrographs (TEM) of single-wall carbon nanotubes made according to Example 2.
Figure 6:
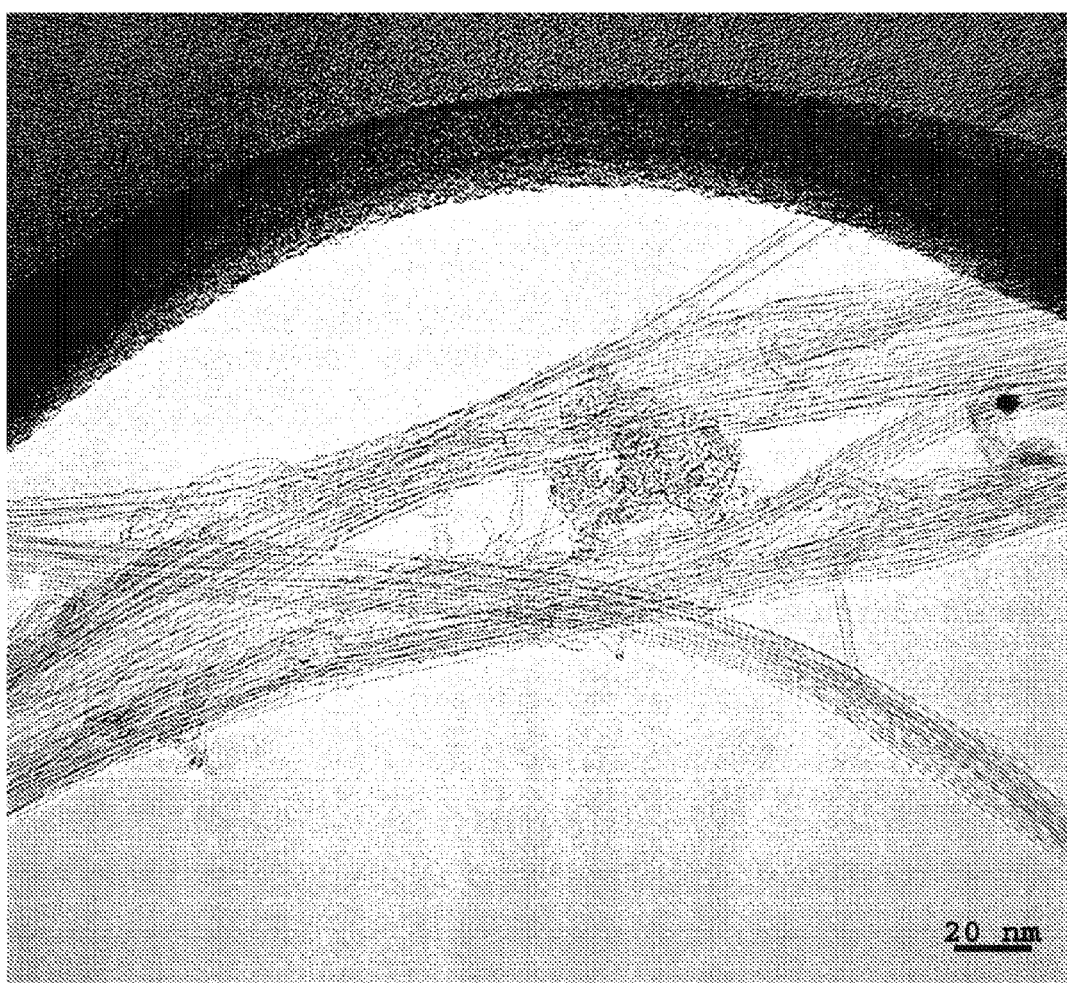

Nanotube growth was conducted according to the procedure in Example 1. The resulting black product was examined by TEM, and typical TEM images are shown in FIGS. 5 and 6. Ropes of single-wall carbon nanotubes are clearly seen. A few multiwall carbon nanotubes can also be seen in the micrographs. The diameter of the as-grown single-wall carbon nanotubes were about 1 nm, as determined by image analysis.

Figure 7:
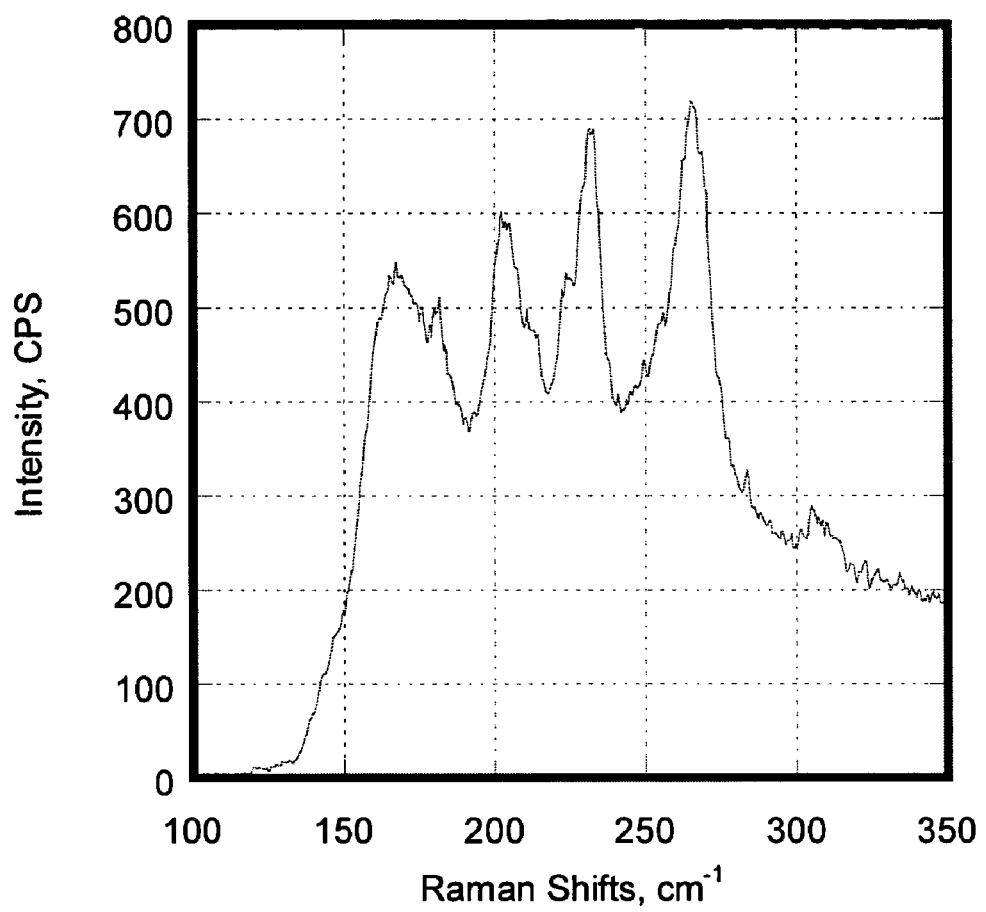
FIG. 7 shows radial breathing mode (RBM) Raman shifts for as-grown single-wall carbon nanotubes. Excitation was provided by a 782-nm diode laser.
Figure 8:
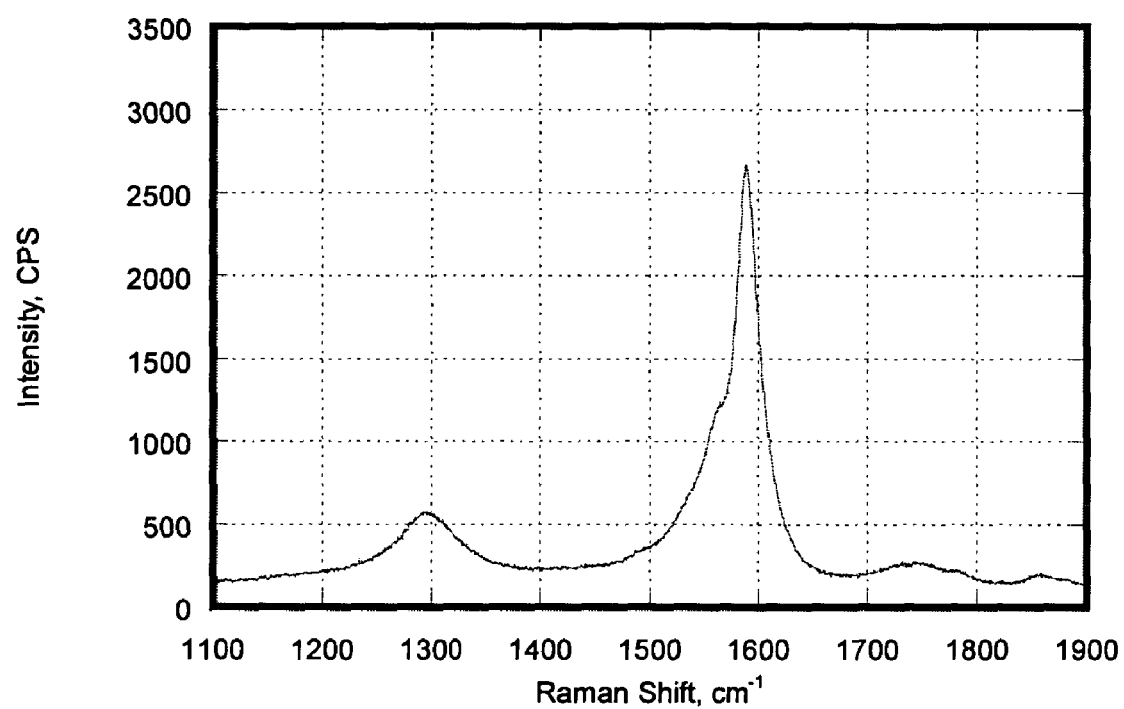
FIG. 8 shows Raman shifts in the tangential G and D band regions for as-grown single-wall carbon nanotubes. Excitation was provided by a 782-nm diode laser.

Raman spectra of the as-grown single-wall carbon nanotubes are shown in FIGS. 7 and 8. Raman excitation was provided by a 782-nm diode laser. Raman shifts in range 100-350 cm$^{-1}$ are characteristics of the radial breathing mode (RBM) peaks of single-wall carbon nanotubes. The diameters identified in the as-grown single-wall carbon nanotubes are estimated from RBM peaks in FIG. 7 to be 0.81, 0.93, 1.07, 1.16, and 1.49 nm. The Raman shift region around 1590 cm$^{-1}$ in FIG. 8 is called the G band and is characteristic of the tangential phonon mode of single-wall carbon nanotubes. The Raman shift region around 1300 cm$^{-1}$ is called the D band and is associated with disordered, amorphous carbon. The ratio of the heights of the G and D peaks is an indication of the purity of the single-wall carbon nanotubes with regard to extraneous carbon. In the present example, the ratio of G/D was 6.2, which suggests that the sample was mostly single-wall carbon nanotubes with only a little extraneous carbon and indicative of a high quality single-wall carbon nanotube sample.

The single-wall carbon nanotube product was analyzed by thermogravimetric analysis (TGA) in air. The carbon yield was estimated by this method to be about 40% with respect to the weight of the catalyst.

EXAMPLE 3

Figure 9:
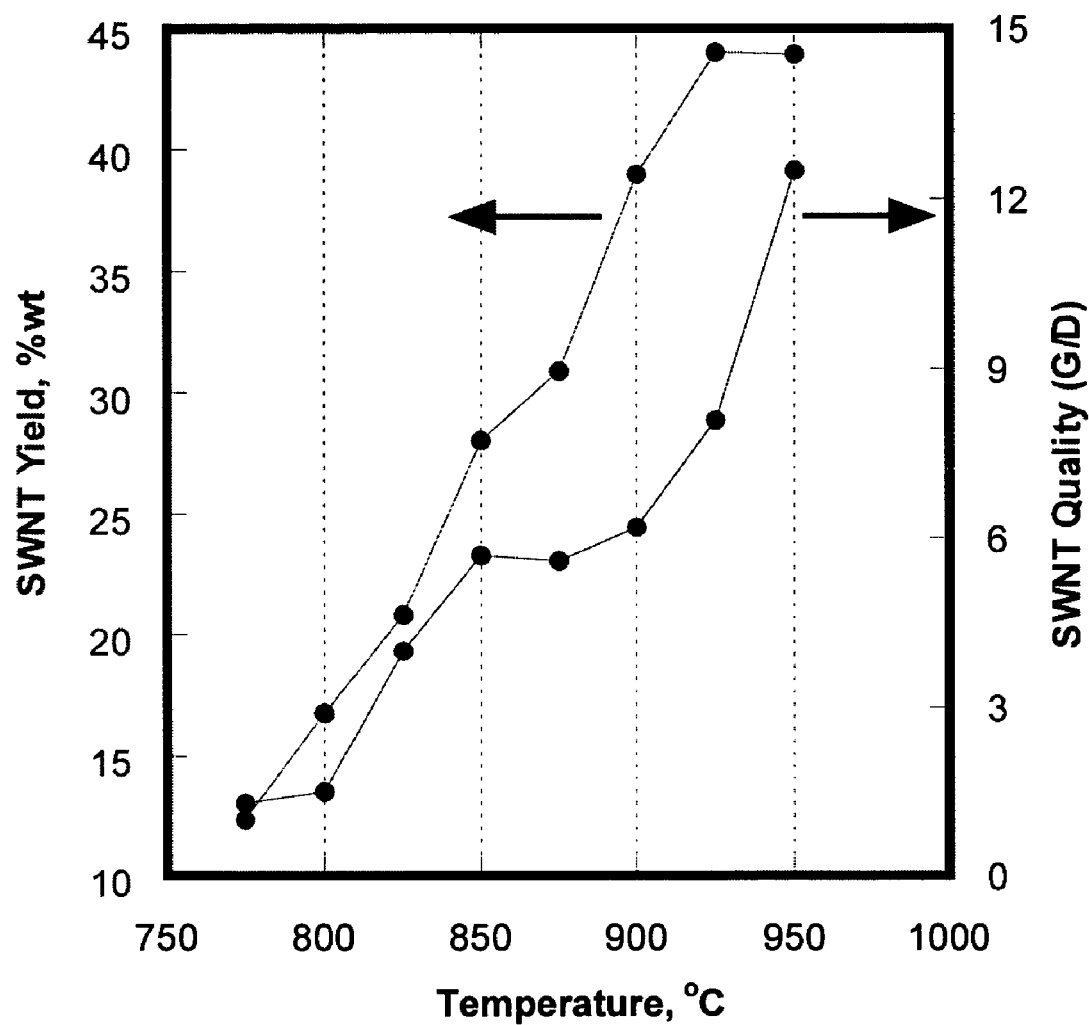
FIG. 9 shows plots of carbon yields and Raman G/D peak intensity ratios versus nanotube growth temperatures per Example 3. Raman excitation was provided by a 782-nm diode laser.

The catalyst prepared in Example 2 was used in a series of single-wall carbon nanotube growth experiments at different temperatures, including 775, 800, 825, 850, 875, 925, and 950° C. The nanotube growth procedure was identical to Example 2, except for the growth temperature. Single-wall carbon nanotubes were made at each temperature and analyzed by TEM. The carbon yields determined by TGA, and the G/D peak intensity ratios determined from Raman spectroscopy, are plotted in FIG. 9. Higher growth temperatures gave higher carbon yields with less extraneous carbon. In general, the highest single-wall carbon nanotube yields were obtained with hydrocarbon feedstock at reaction temperatures above about 800° C.

EXAMPLE 4

The catalyst prepared in Example 2 was used for growth of single-wall carbon nanotubes at various hydrocarbon feedstock contact times of 1, 10, 20, and 60 seconds. In each growth experiment, about 0.1 g was loaded in the reactor described in Example 1, but operated in fixed fluidized-bed mode. The temperature of the reactor was ramped up at a rate of 20° C./min under an argon purge to 500° C. The catalytic metal on the catalyst was reduced with hydrogen in a 10% $H_2$/argon mixture for 10 minutes at 500° C. After reduction, the reactor was increased to 900° C. under an argon purge. While maintaining the argon flow at 900° C., a pulse of $CH_4$ was injected for 1 second. After the methane injection, the reactor was cooled to room temperature under an argon purge. The same experimental procedures were repeated with methane injection times of 10, 20, and 60 seconds. The recovered materials from the different contact times were different shades of black. The carbon yields, as determined by TGA, are summarized in Table 1.

TABLE 1

| Methane contact time (sec) | Carbon yield on catalyst (wt %) |
| --- | --- |
| 1 | 7.7 |
| 1 (without reduction) | 7.5 |
| 10 | 10.2 |
| 20 | 11.7 |
| 60 | 22.0 |

Raman spectra showing the RBM shifts of the single-wall carbon nanotubes in products obtained with 1-second, 10-second, 20-second, and 60-second contact times with methane are shown in FIGS. 11A, 11B, 11C and 11D, respectively. The RBM Raman shifts show that single-wall carbon nanotubes of certain diameter grown preferentially at certain growth times. In FIG. 11A, having a 1-second growth time, the most noticeable feature is 234 $cm^{-1}$, corresponding to a single-wall carbon nanotube diameter of 1.0 nm. The nanotube diameters were determined from the RBM shifts using the relationship:

$$d = a/\omega$$

where d is the SWNT diameter in nm,
a is the constant 232 nm/cm, and
$\omega$ is the RBM frequency in $cm^{-1}$.

Other smaller peaks at 266, 226, 216, 204, and 187 $cm^{-1}$ indicate that presence of SWNT with diameters of 0.88, 1.03, 1.07, 1.14, and 1.24 nm, respectively. This radial breathing mode (RBM) pattern predominated for the 10-second and 20-second growth times. At 60-second contact time, considerable enhancement of the peaks at 266 $cm^{-1}$ and 204 $cm^{-1}$, corresponding to SWNT diameters of 0.88 nm and 1.14 nm, respectively, indicated that both small and large diameter SWNT were grown at greater than 20-second contact growth times.

Raman spectra showing the tangential mode shifts of the single-wall carbon nanotubes in products obtained with 1-second, 10-second, 20-second, and 60-second contact times with methane are shown in FIGS. 12A, 12B, 12C and 12D, respectively. The characteristic tangential Raman shift at 1590 $cm^{-1}$ is prominent in all samples. The change in the D band Raman shift at about 1300 $cm^{-1}$, in FIGS. 12A, 12B, 12C and 12D, suggests that single-wall carbon nanotubes of various length distributions are produced according to growth time. By controlling the contact time, single-wall carbon nanotubes of the desired size and length can be produced.

EXAMPLE 5

Single-wall carbon nanotubes were grown according to Example 4 using methane and a 1-second methane contact time, however, the catalyst metal was not subjected to reduction conditions prior to methane introduction. The carbon yield on catalyst was 7.5 wt % versus 7.7 wt % with hydrogen reduction. See Table 1.

EXAMPLE 6

Catalyst was prepared with according to the procedures given in Example 2. The Co:Mo weight ratio was fixed at 2.6:1, but the metal loading was varied. Single-wall carbon nanonotubes were grown according to conditions given in Example 2. At a metal loading of about 9 wt % (equivalent to a 6.45 wt % Co and 2.55 wt % Mo), the total carbon weight gain was 72.3 wt % of the catalyst, as determined by TGA. TEM imaging showed that when total metal loading was above about 9 wt % on the support, substantial amount of multiwall carbon nanotubes was observed in the product. A decrease in carbon yield on catalyst was observed at metal loadings above about 9 wt % on the support.

EXAMPLE 7

Figure 10:
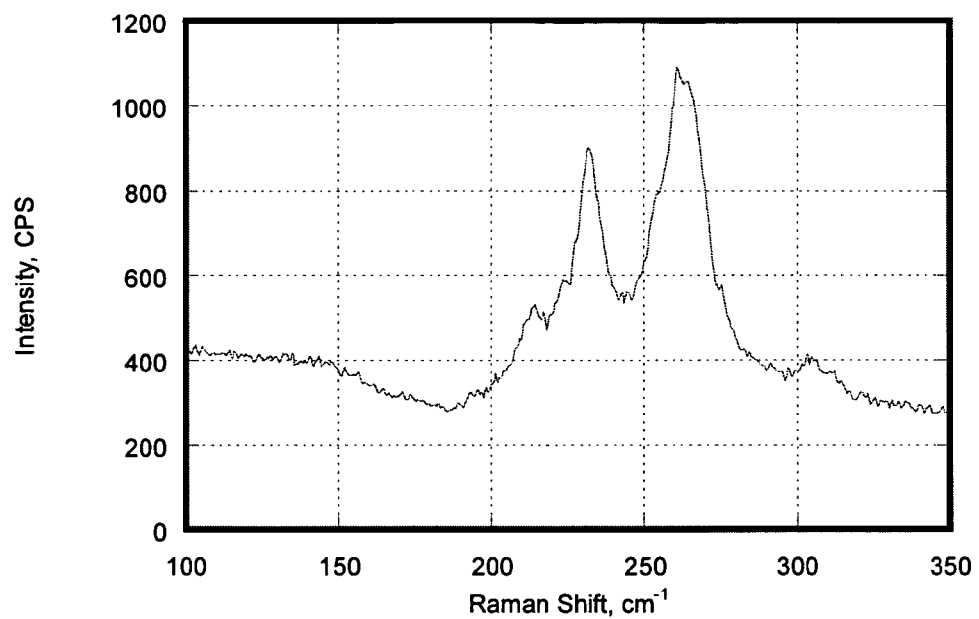
FIG. 10 shows RBM Raman shifts for single-wall carbon nanotubes made with a catalyst combusted at 550° C. Excitation was provided by a 782-nm diode laser.
Figure 12A:
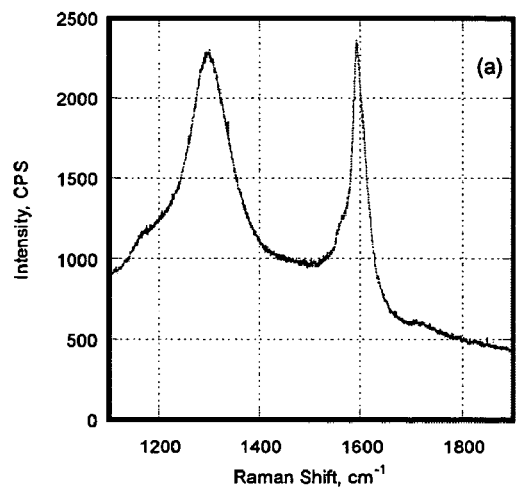
FIG. 12A shows tangential mode Raman shifts for single-wall carbon nanotubes prepared according to Example 4 from a 1-second injection of methane. Raman excitation was provided by a 782-nm diode laser.
Figure 12B:
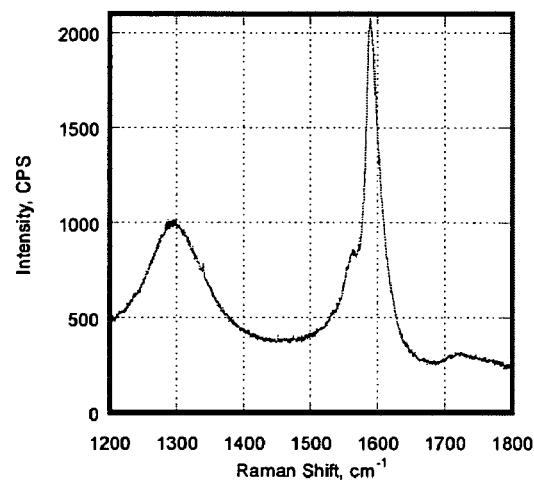
FIG. 12B shows tangential mode Raman shifts for single-wall carbon nanotubes prepared according to Example 4 from a 10-second injection of methane. Raman excitation was provided by a 782-nm diode laser.
Figure 12C:
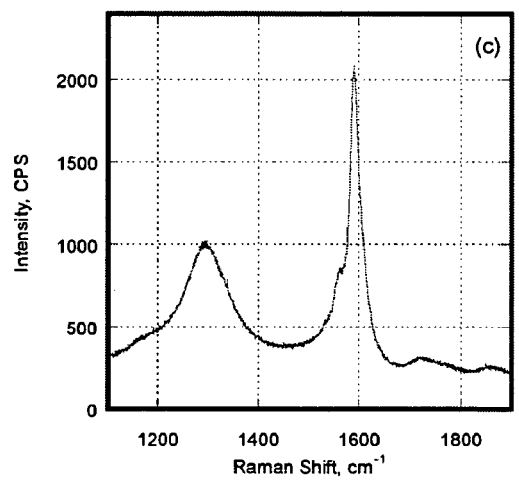
FIG. 12C shows tangential mode Raman shifts for single-wall carbon nanotubes prepared according to Example 4 from a 20-second injection of methane. Raman excitation was provided by a 782-nm diode laser.
Figure 12D:
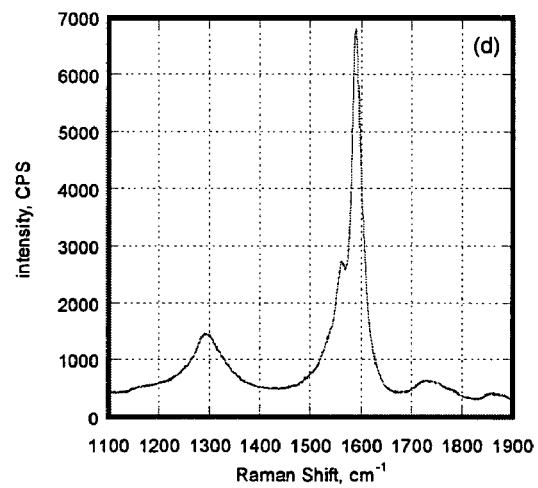
FIG. 12D shows tangential mode Raman shifts for single-wall carbon nanotubes prepared according to Example 4 from a 60-second injection of methane. Raman excitation was provided by a 782-nm diode laser.

Catalyst was prepared according to Example 2 except that the combustion step was carried out was in a furnace preset at 550° C. Single-wall carbon nanotubes were grown according to Example 2. The RBM Raman shifts of the single-wall carbon nanotubes in the product are shown in FIG. 10, and are indicative of single-wall carbon nanotube diameters of 0.81, 0.93, 1.07, and 1.16 nm. Comparison of the data of FIG. 7 (product of Example 2) and the data of FIG. 10 shows that the catalyst preparation parameters modify the diameter distribution of the single-wall carbon nanotubes produced. In this example, catalyst preparation including a 550° C. combustion yielded single-wall carbon nanotubes with larger average diameters than those produced from catalyst prepared with a 650° C. combustion.

EXAMPLE 8

The catalyst of Example 2 was treated with thiophene before growing single-wall carbon nanotubes. 0.95 g catalyst was loaded into the reactor and purged with argon at room temperature. The reactor temperature was raised at a rate of 20° C./min to 500° C. At 500° C., the argon was switched to bubble through thiophene kept at 0° C. in an ice bath. After 10 minutes of thiophene addition, the bubbler was shut off and the reactor temperature was raised to 900° C. under pure argon. At 900° C., the argon was turned off and $CH_4$ gas was turned on to grow nanotubes. After the 10 minutes, the methane was turned off and argon turned on. The reactor was then cooled to room temperature under argon flow.

The total carbon weight gain was 50 wt % of the catalyst, as determined by TGA. TEM showed that about 95% of nanotubes were single-wall carbon nanotubes.

EXAMPLE 9

0.40 g iron (III) nitrate nonahydrate (Mol. Wt. 404.02), 0.0365 g ammonium heptamolybdate tetrahydrate, 10 magnesium nitrate hexahydrate, and 4 g anhydrous citric acid were dissolved in 10 mls deionized water in a 500-ml beaker. The clear solution of these chemicals was combusted in air at 550° C. and kept at 550° C. for 60 minutes. The physical characteristics of the ground catalyst powder were similar to those of the catalyst in Example 2.

Single-wall carbon nanotube growth was carried using conditions given in Example 2. The total carbon weight gain was 24 wt % of the catalyst, as determined by TGA. TEM showed that about 95% of nanotubes were single-wall carbon nanotubes.

EXAMPLE 10

0.40 g iron (III) nitrate nonahydrate, $(Fe(NO_3)_3.9H_2O)$ (Mol. Wt. 404.02), 0.0365 g ammonium heptamolybdate tetrahydrate $((NH_4)_6Mo_7O_{24}.4H_2O)$, 10 g magnesium nitrate hexahydrate $(Mg(NO_3)_2.6H_2O)$, and 4 g anhydrous citric acid were dissolved in a 500-ml beaker with 10 mls deionized water. As soon as a clear solution was formed, the beaker was placed in a high temperature furnace preheated at 650° C. A sudden drop in furnace temperature was observed. In a few minutes the solution foamed and a large quantity of light yellow fluffy flakes filled the beaker. The furnace temperature was reduced to 550° C. and the catalyst was held at 550° C. for 60 minutes. The catalyst was removed from the furnace and placed in a desiccator. With aid of a blender, the catalyst flakes were readily ground to fine flowing powder. The physical characteristics of the catalyst powder were small primary particle size (<5 µm) and very low bulk density (~0.1 g/cm$^3$). The chemical composition of the resulting catalyst was: 3.5 wt % Fe and 1.3 wt % Mo. In an ambient environment, the catalyst can absorb gases, such as carbon dioxide ($CO_2$) and moisture. The catalyst can lose up to about 8 wt % when heated up to about 800° C. in air.

0.25 g catalyst was placed in quartz tube fitted with a quartz frit in the middle to hold the catalyst in place and operate the reactor as a fluidized bed reactor. The reactor was placed vertically in a high temperature tubular furnace. A gas control system supplied various gases from the bottom of the reactor tube. The reactor was first purged with argon gas (flow rate: 150 sccm) and the temperature increased at a rate of 20° C./min to 900° C. At 900° C., methane ($CH_4$) was turned on for 30 seconds and then turned off.

The reactor was cooled to room temperature under an argon purge. The resulting material retrieved from the reactor was dark black powder. The growth of SWNT, as measured by TGA ramped to 800° C. in air, was 20.6 wt % with respect to the catalyst weight.

The as-grown product was first oxidized in air at 300° C. for 1 hour, and then thoroughly mixed with excess of 20 wt % citric acid to remove catalyst. The citric acid-treated product was washed with water and acetone repeatedly and oven-dried at 100° C. to produce a purified product. The purified product, as analyzed by TGA, contained less than 3 wt % catalyst residue.

Figure 13:
FIG. 13 shows a TEM of single-wall carbon nanotubes made according to Example 10.

A few milligrams of the purified product were suspended in ethanol with ultrasonic aid. A few drops of the suspension were deposited on a lacey carbon copper grid. After the ethanol was dried, the product was examined by transmission electron microscope (JEOL JEM2010) up to 100 kV. The TEM images are shown in FIG. 13 (MGP2 199p). Ropes of SWNT are clearly seen. Image analysis indicated that diameter of the SWNT was about 1 nm.

EXAMPLE 11

This example demonstrates the production of single-wall carbon nanotubes using the catalyst of Example 10 treated with a sulfur-containing compound.

1 g catalyst, as prepared in Example 10, was placed in a fluidized bed reactor. The reactor was purged with argon gas (flow rate: 150 sccm) and the temperature was increased at a rate of 20° C./min to 500° C. At 500° C., thiophene ($C_4H_4S$, Acros) was introduced to the catalyst by passing the argon through thiophene held at room temperature for 10 minutes. After thiophene treatment, the reactor temperature was raised to 850° C. under an argon purge. At 850° C., the argon was turned off and methane ($CH_4$, Matheson) was introduced for 10 minutes to grow nanotubes. After the 10 minutes of growth reaction, the methane was turned off and argon was turned on. The reactor was cooled to room temperature under an argon purge. The resulting material retrieved from the reactor was dark black powder. The growth of SWNT, as measured by TGA ramped to 800° C. in air, was 32.3 wt % with respect to the catalyst weight.

Figure 14:
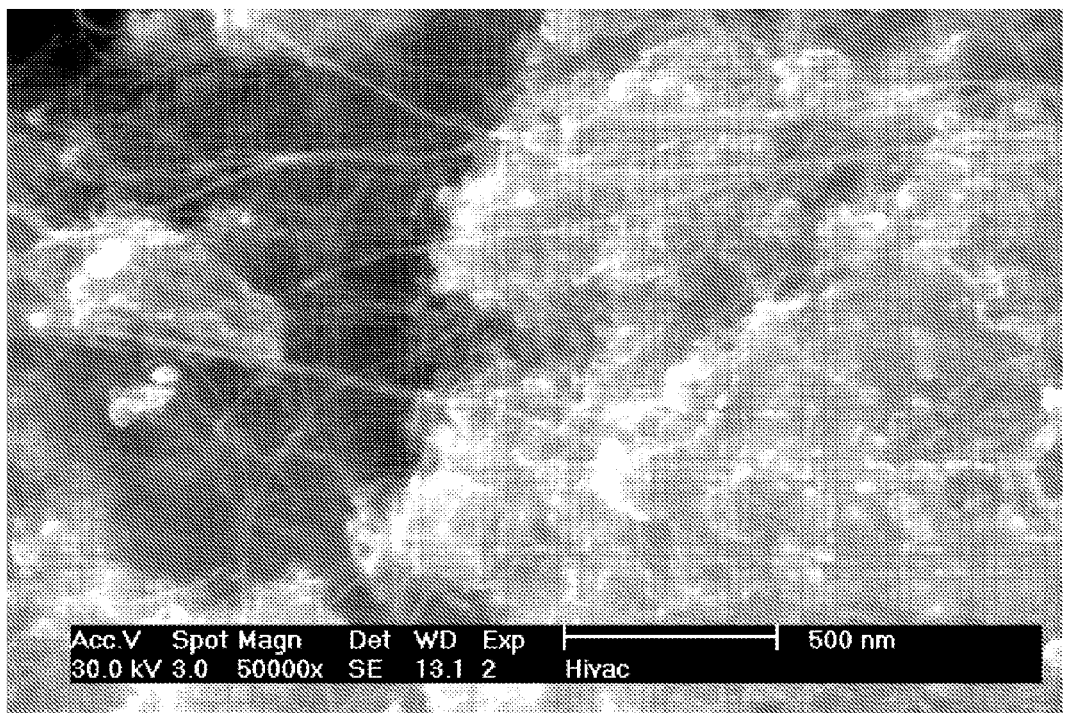
FIG. 14 shows a scanning electron micrograph (SEM) image of as-produced single-wall carbon nanotube product made according to Example 11.

Scanning electron microscopy (SEM) was used to examine the as-produced material. Images in FIG. 14 clearly show the ropes of nanotubes on the surface and in the porous structure of catalyst support.

The as-grown product was thoroughly mixed with excess 20 wt % aqueous citric acid. Citric acid solutions of different concentrations, as low as about 2 wt %, were also found to be effective in removing catalyst support. The citric acid-treated product was washed with water and acetone repeatedly and oven-dried at 100° C. to give a purified SWNT product, which was analyzed by TGA to contain about 4 wt % catalyst residue.

Figure 15:
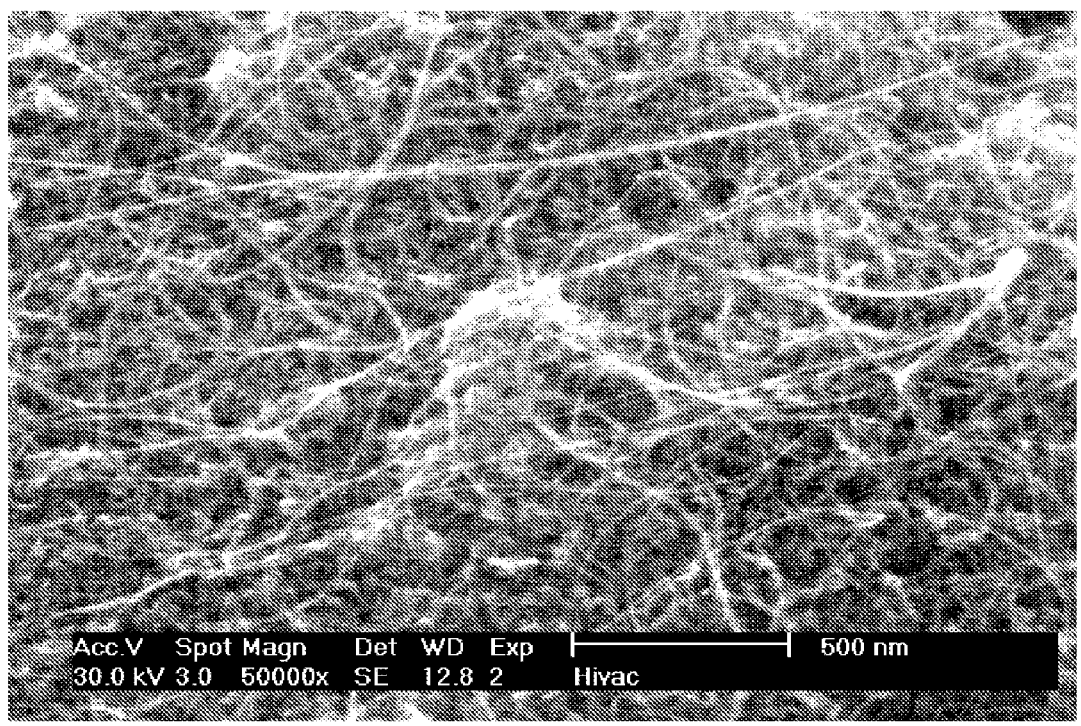
FIG. 15 shows a SEM image of purified single-wall carbon nanotubes made according to Example 11.
Figure 16:
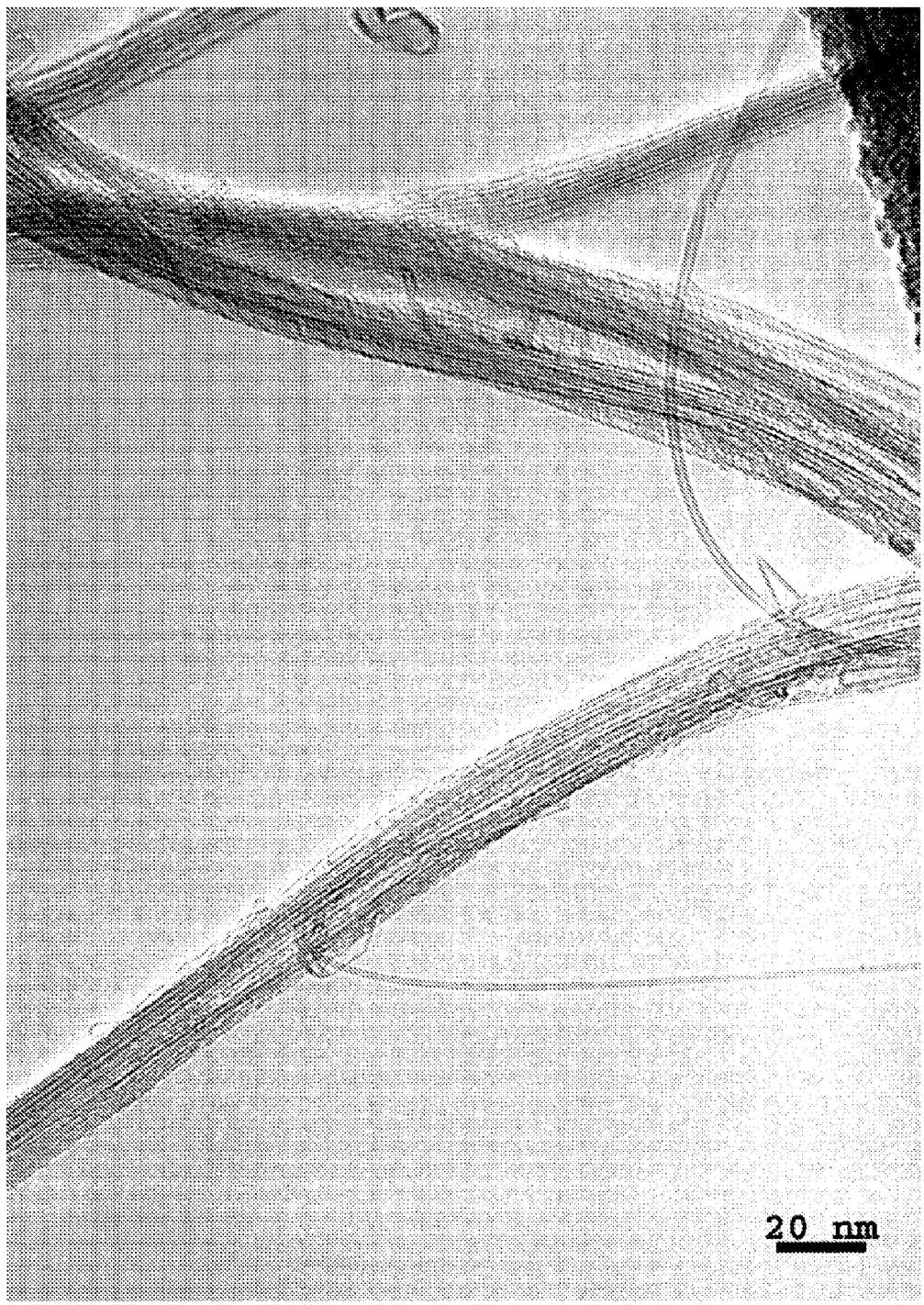
FIG. 16 shows a TEM image of purified single-wall carbon nanotubes made according to Example 11.

SEM images of the purified SWNT product are shown in FIG. 15 and transmission electron microscopy (TEM) images of the purified SWNT with citric acid are shown in FIG. 16. TEM image analysis indicated that diameter of the SWNT was about 1 nm.

EXAMPLE 12

This example demonstrates the growth of single-wall carbon nanotubes using a catalyst with a different iron and molybdenum composition. 1.1 g iron nitrate nonahydrate $(Fe(NO_3)_3.9H_2O)$, 0.028 g ammonium heptamolybdate tetrahydrate $((NH_4)_6Mo_7O_{24}.4H_2O)$, 20 g magnesium nitrate hexahydrate $(Mg(NO_3)_2.6H_2O)$, and 6 g anhydrous citric acid were dissolved in 20 ml deionized water in a 500-ml beaker. The rest of the preparation procedure was identical to Example 10. The catalyst metal composition of the resulting catalyst was 4.8 wt % Fe and 0.48 wt % Mo. The physical properties were similar those of the catalyst in Example 10.

1 g catalyst was placed in a fixed fluidized bed reactor. The reactor was first purged with argon gas (flow rate: 150 sccm) and the temperature was increased at a rate of 20° C./min to 850° C. At 850° C., the argon was turned off and methane (CH$_4$) was turned on for 10 minutes and then turned off. The reactor was cooled to room temperature under an argon purge. The resulting material retrieved from the reactor was dark black powder. The growth of SWNT, as measured by TGA ramped to 800° C. in air, was 15.4 wt % with respect to the catalyst weight.

EXAMPLE 13

Figure 17A:
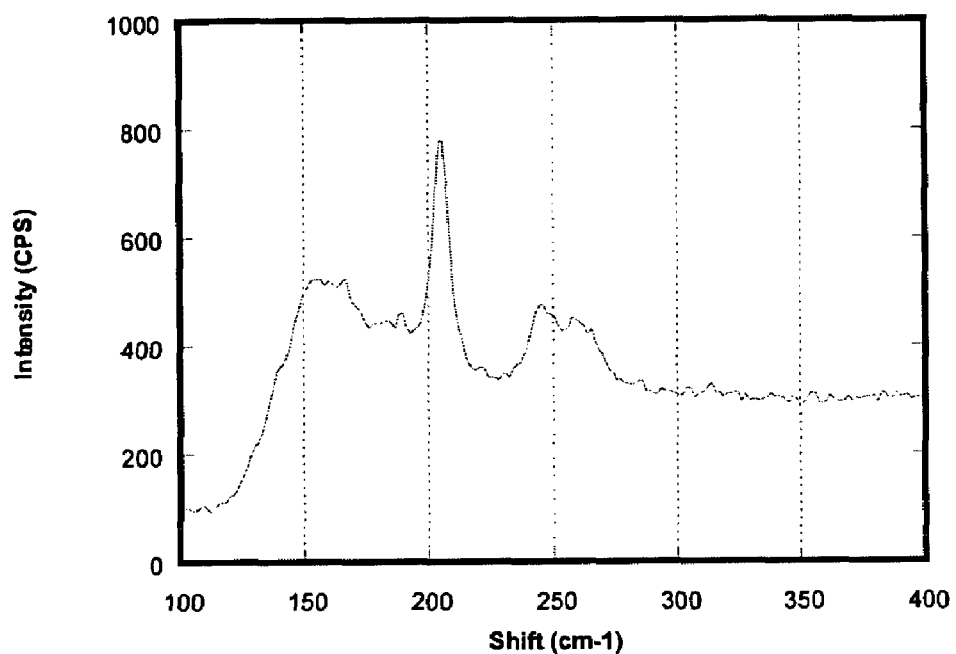
FIG. 17A shows a Raman spectrum of the RBM shifts of as-grown SWNT prepared by the procedures of Example 13. The growth temperature was 900° C. and the excitation wavelength was 514 nm.
Figure 17B:
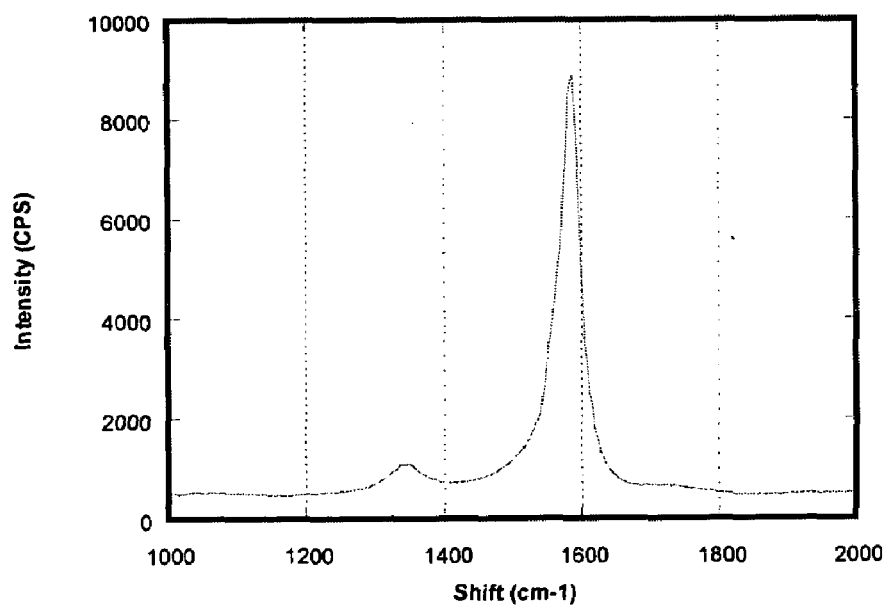
FIG. 17B shows a Raman spectrum of the tangential mode shifts of as-grown SWNT prepared by the procedures of Example 13. The growth temperature was 900° C. and the excitation wavelength was 514 nm.

The procedure of Example 12 was repeated except that the 10-minute growth was conducted at a temperature of 900° C. The carbon gain was 15.9 wt % with respect to catalyst weight. As-grown material was analyzed by TEM and Raman spectroscopy. A Raman spectrum of the RBM shifts of the single-wall carbon nanotubes in the as-grown product is shown in FIG. 17A. A Raman spectrum of the tangential mode shifts of the single-wall carbon nanotubes in the as-grown product is shown in FIG. 17B.

EXAMPLE 14

This example demonstrates the preparation single-wall carbon nanotubes with a supported iron catalyst. 0.225 g iron nitrate nonahydrate (Fe(NO$_3$)$_3$.9H$_2$O), 20 g magnesium nitrate hexahydrate (Mg(NO$_3$)$_2$.6H$_2$O), and 6 g anhydrous citric acid were dissolved in 20 mls deionized water in a 500-ml beaker. The rest of the preparation procedure was identical to Example 10. The iron content of the resulting catalyst was 1.0 wt % Fe on MgO. The physical properties of the catalyst were similar to those of the catalyst in Example 10.

1 g catalyst was placed in a fluidized bed reactor. The reactor was first purged with argon gas (flow rate: 150 sccm) and the temperature was increased at a rate of 20° C./min to 850° C. At 850° C., argon was turned off and methane (CH$_4$) was turned on for 10 minutes and then turned off. The reactor was cooled to room temperature under an argon purge. The resulting material retrieved from the reactor was dark black powder. The growth of SWNT, as measured by TGA in air up to 800° C., was 7.3% wt with respect to the catalyst weight.

Figure 18A:
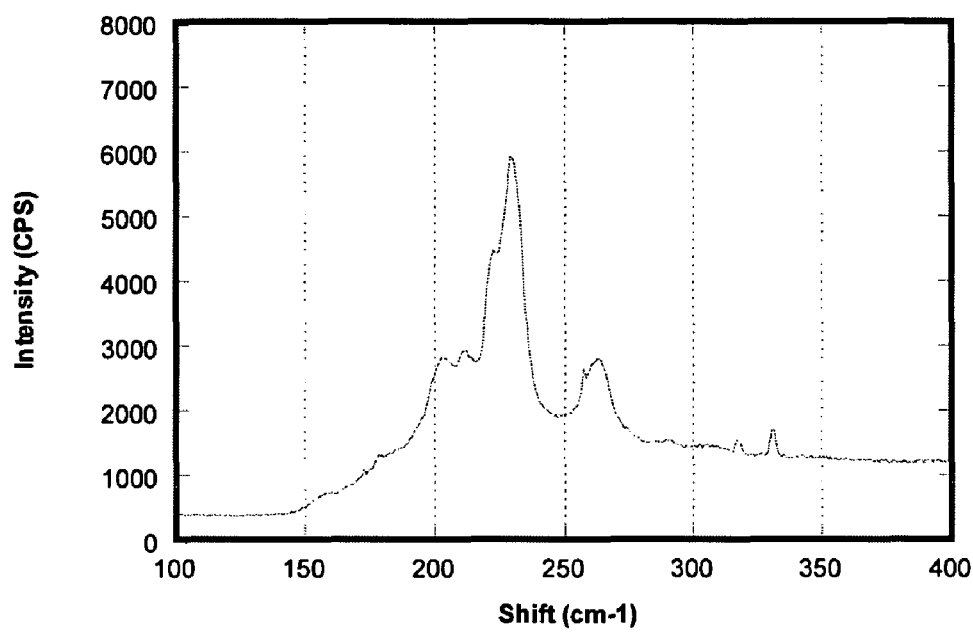
FIG. 18A shows a Raman spectrum of the RBM shifts of as-grown SWNT prepared by the procedures of Example 14. The growth temperature was 850° C. and the excitation wavelength was 782 nm.
Figure 18B:
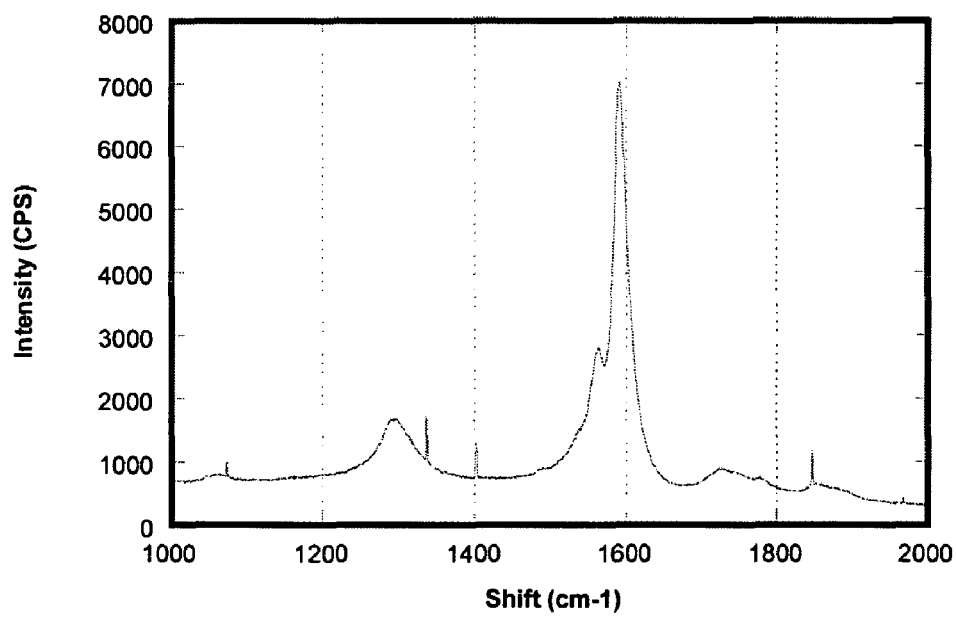
FIG. 18B shows a Raman spectrum of the tangential mode shifts of as-grown SWNT prepared by the procedures of Example 14. The growth temperature was 850° C. and the excitation wavelength was 782 nm.

The as-grown SWNT product was analyzed by Raman spectroscopy. A Raman spectrum of the RBM shifts of the single-wall carbon nanotubes in the as-grown product is shown in FIG. 18A. A Raman spectrum of the tangential mode shifts of the single-wall carbon nanotubes in the as-grown product is shown in FIG. 18B.

Comparison of the radial breathing mode (RBM) peaks of FIGS. 17A and 18A indicates substantial differences in the diameter distributions produced with different catalyst composition, where larger diameter nanotubes are produced when the catalyst contained a lower concentration of catalytic metal.

A comparison of carbon product and single-wall carbon nanotube production on catalysts prepared according to Examples 2, 8, 9 and 13 is given in Table 2.

TABLE 2

| Examples run at 900° C. | Catalyst (molar ratio) | Metal on MgO (wt %) | Temperature (° C.) | Carbon Yield (%) | SWNT (%) |
|---|---|---|---|---|---|
| 2 | Co/Mo/Mg 2.2/0.53/100 | 4.5 | 900 | 40 | |
| 8 | Co/Mo/Mg 2.2/0.53/100 with thiophene | 4.5 | 900 | 50 | 95 |
| 9 | Fe/Mo/Mg 2.5/0.53/100 | 4.8 | 900 | 24 | 95 |
| 13 | Fe/Mo/Mg 3.5/0.2/100 | 5.3 | 900 | 15.9 | |

EXAMPLE 15

This example demonstrates the preparation of single-wall carbon nanotubes using the catalyst made with the same proportions as Example 12 in a scaled-up fixed fluidized bed mode of operation, that is, a fixed amount of catalyst was used with a continuous flow of gaseous feedstock. A fluidizing aid was used and the reactor was operated at about atmospheric pressure.

A tubular reactor (8-inch I.D. diameter by 10 feet) was loaded with 94 lbs of ceramic beads (approximately 200 microns in diameter) as a fluidizing aid. The ceramic beads were fluidized with flowing argon (48 SCF/hr) and the reactor was heated up to about 1660° F. (about 904° C.). A side flow of argon gas was used to pick up and carry the catalyst to the reactor. Prior to entry into the bottom of the reactor, the catalyst and argon carrier gas were preheated to about 1660° F. (about 904° C.). While the catalyst was being charged to the reactor, the argon was turned off and 25 SCF/hr of methane, preheated to about 1660° F., was injected into the bottom of the reactor. About 0.54 lbs (about 245 g) catalyst was charged to the reactor over a 10-minute period. Most of the catalyst was fluidized in the reactor, but some of the catalyst was blown overhead and out of the reactor before making much, if any, nanotubes on the catalyst. After 10 minutes, catalyst flow to the reactor was stopped. The flow of heated methane gas was continued for 10 more minutes to allow for further the growth of the nanotubes. By using the ceramic beads, the temperature of the fluidized bed was held almost constant during the 10-minute reaction period and only dropped about 6° F. (about 3° C.) from the initial reaction temperature. The methane was then stopped and the fluidized bed was cooled under. flowing nitrogen. The nanotubes and the ceramic beads were separated by increasing the flow of nitrogen such that the less dense catalyst particles with attached nanotube product were carried overhead with the nitrogen flow, while the larger, heavier and denser ceramic beads remained behind in the reactor.

TGA of the product made according to this example indicated 31.5 wt % carbon product on the catalyst.

EXAMPLE 16

This example demonstrates the preparation of single-wall carbon nanotubes using the catalyst made with the same proportions as Example 12 in a scaled-up fixed fluidized bed mode of operation, such as described in Example 15, except that no fluidizing aid was used. The reactor was operated at about atmospheric pressure.

Catalyst was picked up by a side stream flow of argon gas to form a catalyst/argon mixture, which was then preheated to about 1830° F. (about 999° C.) before being introduced into the reactor. A total of 0.62 lbs (about 281 grams) catalyst was charged to the reactor over a 10-minute period. While the catalyst was being charged, 50 SCF/hr of methane, preheated to about 1830° F. (about 999° C.), was injected into the bottom of the reactor. Most of the catalyst was fluidized in the reactor, but a small amount of the catalyst was blown overhead and out of the reactor before making much, if any, nanotubes on the catalyst, and a small amount of catalyst was found after the reaction at the reactor inlet and did not enter the reactor. After 10 minutes, the catalyst flow was stopped and the preheated methane was allowed to flow for an additional 10 minutes to continue the nanotube growth. The methane was then stopped and the catalyst bed, with nanotube product attached, was cooled with flowing nitrogen. An increased flow of nitrogen was then introduced to blow the reacted catalyst with nanotubes overhead and out of the reactor. During the 20 minutes of reaction time, the temperature of the catalyst fluidized bed dropped by about 153° F. to 1677° F. (about 914° C.) after 11 minutes due to the reaction endotherm. After the full 20 minutes of the reaction, the temperature was 1740° F. (about 949° C.) or about 90° F. lower than the initial temperature.

TGA of the product made according to this example indicated 24.6 wt % carbon product on the catalyst.

EXAMPLE 17

This example demonstrates the preparation of single-wall carbon nanotubes using the catalyst made with the same proportions as Example 12 in a transport reactor, that is the catalyst and reacting feedstock flow through the heated reactor pipe at the same rate. The reactor was operated at about atmospheric pressure.

Catalyst was picked up at a rate of 1.52 lb/hr by a side stream flow of nitrogen gas at 75 SCF/hr to form a catalyst/nitrogen mixture, which was then preheated to the reaction temperature before being introduced into the reactor, a 3-inch I.D. by 24-foot long heated pipe reactor. An additional 75 SCF/hr of nitrogen gas was separately introduced into the heated 3-inch I.D. pipe reactor. Methane, the feedstock gas, at 70 SCF/hr was heated up to reaction temperature and mixed with the catalyst/nitrogen mixture and the nitrogen flow. The temperature was about 890° C. near the point where the methane mixed with the catalyst/nitrogen mixture. The reaction residence time was estimated to be about 3.7 seconds.

No hydrogen was mixed with the methane feedstock, however, some byproduct hydrogen was generated in situ in the production of the nanotubes, and as a result, a small amount of hydrogen was present in the exit gas. TEM pictures of the carbon product indicated a large amount of amorphous carbon present with the single-wall carbon nanotubes produced. TGA (Thermogravimetric analysis) indicated that the amount of carbon product made was about 12.2 wt % of the catalyst.

EXAMPLE 18

This example demonstrates the preparation of single-wall carbon nanotubes using the catalyst made with the same proportions as Example 12 in a lab-scale fixed fluidized bed mode of operation, without the use of a fluidizing aid. The reactor was operated at about atmospheric pressure.

Figure 19:
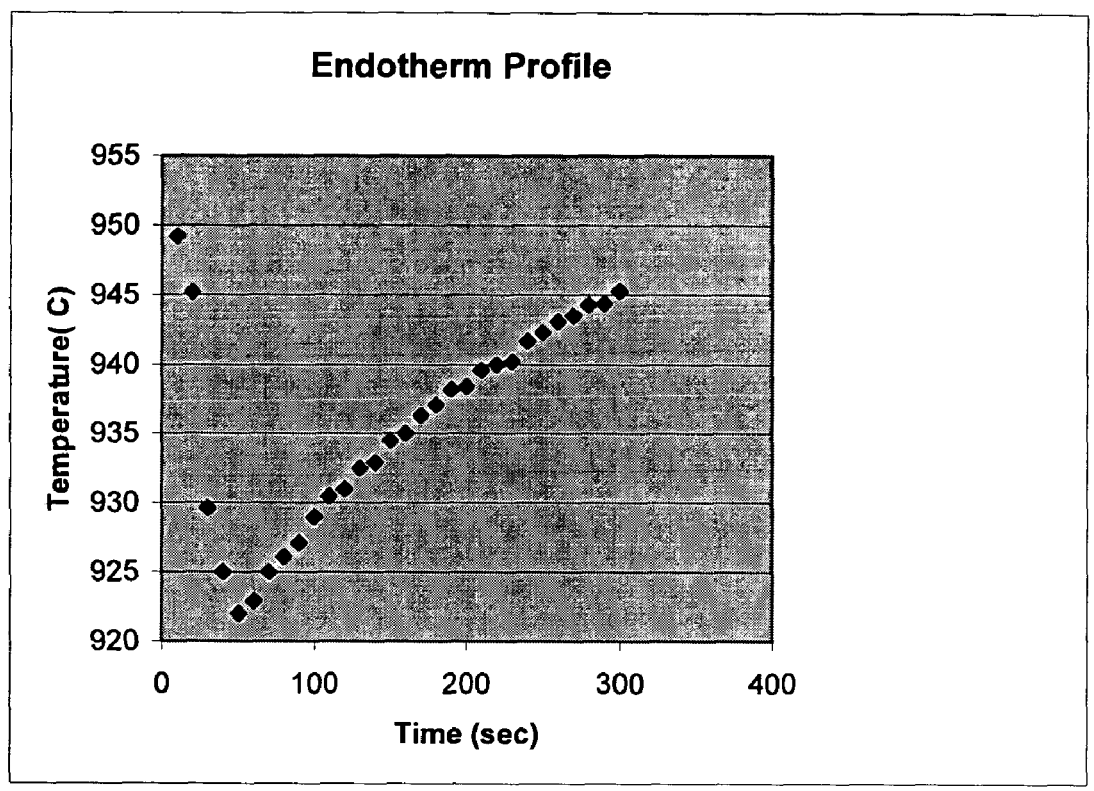
FIG. 19 shows the reaction temperature profile of a reaction carried out according to Example 18.

60 g of catalyst was loaded into a quartz tube (2.25-inch I.D. by 3-feet long) fitted with a quartz frit in the middle of the reactor to hold the catalyst in place and to distribute the argon or methane feedstock to the reactor cross section and to conduct the reaction in a fluidized bed reactor. The reactor was placed vertically in a high temperature tubular furnace and gases were supplied from the bottom of the reactor tube. The reactor was first purged with argon gas. The reactor temperature was raised at heating rate 20° C./min to 949° C. Subsequently, the argon flow was stopped and heated methane ($CH_4$) was introduced at the rate of 3000 sccm for 5 minutes. Finally, the reactor was cooled to room temperature under argon purge. The resulting material retrieved from the reactor was a dark black powder. The reaction temperature dropped 27° C. after about 50 seconds due to the endothermic nature of the reaction. The temperature profile and endotherm of the reaction is shown in FIG. 19. At various times during the run gas bag samples were taken of the reactor outlet gas. Methane, hydrogen and carbon monoxide were detected during the first minute of reaction. At 1.5 minutes into the run, only methane and hydrogen were detected. In this example, the concentration of hydrogen was high for the early part of the reaction. The normalized hydrogen content of the outlet gas was 42% at 30 sec, 82% at 60 sec, 62% at 90 sec and 28% at 5 minutes, the end of the run. The TEM of the carbon product showed mostly single-wall carbon nanotubes with little or no amorphous carbon. Although not meant to be held by theory, the high purity of the nanotubes and low amount of amorphous carbon are attributed to the presence of high amounts of hydrogen with the feedstock during the run.

TGA of the product made according to this example indicated 6 wt % carbon product on the catalyst.

EXAMPLE 19

This example demonstrates the preparation of catalyst using spray combustion, in which a solution of catalyst precursors is sprayed into a heated chamber to form an aerosol as the solvent evaporates, afterwhich the catalyst precursors combust. The catalyst composition had the same proportions as the catalyst made in Example 12. The chamber was a 6-inch I.D. by 6-ft long and heated by a clamshell heater. The spray nozzle had a 0.02-inch orifice spraying at a 45-degree angle at 40 psi pressure. The pump discharge was about 45 psi. The catalyst precursor solution was introduced to the heated chamber through the orifice nozzle at a rate of 3.2 gal/hr, and the run duration was approximately one hour. 325 SCF/hr (standard cubic feet per hour) of air was introduced at 1313° F. (about 712° C.) to supply heat to vaporize the water and to supply oxygen for the combustion reaction. Three thermocouples were placed in the mid-section of the chamber about 1-foot apart and recorded the following temperatures: top thermocouple: 265° F. at start of run, 189° F. at end of run; middle thermocouple: 377° F. at start of run, 246° F. end of run; bottom thermocouple 348° F. at start of run, 210° F. at end of run.

EXAMPLE 20

This example demonstrates the preparation of catalyst using combustion on a hot surface. The catalyst precursor solution of Example 12 was dropped on a heated surface held at 350° C. After the mixture foamed and reacted for 3 minutes, the resultant catalyst was scraped off the surface and allowed to cool. The catalyst was then crushed to smaller particle size and calcined at 550° C. in air for 12 hours.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method for producing single-wall carbon nanotubes, comprising:
   (a) combusting a foaming agent and iron, molybdenum and magnesium oxide precursors to form a supported catalyst which is a solid solution; and
   (b) contacting the catalyst with a gaseous stream comprising a carbon-containing feedstock at a sufficient temperature and for a contact time sufficient to make a carbon product comprising single-wall carbon nanotubes.

2. The method of claim 1 wherein iron and molybdenum are present in a weight ratio range from about 10 to 1 to about 2 to 1.

3. The method of claim 1 wherein the iron and molybdenum are present in a molar ratio range from about 20 to 1 to about 3 to 1.

4. The method of claim 1 wherein the catalytic metal is present on the magnesium oxide on a weight basis from about 0.5 wt % to at most about 10 wt % of the weight of the magnesium oxide.

5. The method of claim 1 wherein the iron precursor is selected from the group consisting of iron (III) nitrate, iron sulfite, iron sulfate, iron carbonate, iron acetate, iron citrate, iron gluconate, iron hexacyanoferrite, iron oxalate, tris(ethylenediamine) iron sulfate and combinations thereof.

6. The method of claim 1 wherein the iron precursor comprises iron (III) nitrate.

7. The method of claim 1 wherein the molybdenum precursor comprises ammonium heptamolybdate.

8. The method of claim 1 wherein the magnesium oxide precursor comprises magnesium nitrate.

9. The method of claim 1 wherein the combusting includes at least one compound selected from the group consisting of a citric acid, urea, glycine, hydrazine, sucrose, carbohydrazide, oxalyl dihydrazide, sugars, alcohols, and combinations thereof.

10. The method of claim 1 wherein the combusting includes citric acid.

11. The method of claim 1 wherein the combusting is conducted by exposing the precursors to temperatures in the range of about 150° C. and about 1200° C.

12. The method of claim 1 wherein the combusting is conducted by exposing the precursors to temperatures in the range of about 200° C. and about 700° C.

13. The method of claim 1 wherein the combusting is conducted by exposing the precursors to temperatures in the range of about 250° C. and about 650° C.

14. The method of claim 1 wherein the precursors are sprayed to form an aerosol prior to combustion.

15. The method of claim 1 wherein the combusting comprises contacting the precursors with a heated surface.

16. The method of claim 1 wherein the catalyst is exposed to a sulfur-containing compound.

17. The method of claim 16 wherein the sulfur-containing compound is selected from the group consisting of thiophene, hydrogen sulfide, a mercaptan and combinations thereof.

18. The method of claim 16 wherein the sulfur-containing compound comprises thiophene.

19. The method of claim 1 wherein the catalyst has a cross-sectional dimension of less than about 100 microns.

20. The method of claim 1 wherein the catalyst has a cross-sectional dimension of less than about 30 microns.

21. The method of claim 1 wherein the catalyst has a bulk density less than about 0.3 g/cm$^3$.

22. The method of claim 1 wherein the catalyst has a bulk density less than about 0.1 g/cm$^3$.

23. The method of claim 1 further comprising reducing the metal prior to the contacting step.

24. The method of claim 23 wherein the reducing is done with a reducing gas.

25. The method of claim 24 wherein the reducing gas comprises hydrogen.

26. The method of claim 1 wherein the metal is reduced during the contacting step.

27. The method of claim 1 wherein the temperature is in a range of about 500° C. and about 1500° C.

28. The method of claim 1 wherein the temperature is in the range of about 650° C. and about 950° C.

29. The method of claim 1 wherein the temperature is in the range of about 800° C. and about 950° C.

30. The method of claim 1 wherein the carbon-containing feedstock comprises a compound selected from the group consisting of methane, hydrocarbons, carbon monoxide and combinations thereof.

31. The method of claim 1 wherein the gaseous stream comprising the carbon-containing feedstock comprises methane.

32. The method of claim 1 further comprising mixing hydrogen with the gaseous stream comprising carbon-containing feedstock.

33. The method of claim 1 wherein the gaseous stream comprising the carbon-containing feedstock also comprises hydrogen.

34. The method of claim 1 wherein the gaseous stream comprising the carbon-containing feedstock comprises a mixture of methane and hydrogen.

35. The method of claim 1 wherein the contact time is in a range of about 0.1 seconds and about 60 minutes.

36. The method of claim 1 wherein the contact time is in a range of about 0.1 seconds and about 30 minutes.

37. The method of claim 1 wherein the contact time is in a range of about 10 seconds and about 10 minutes.

38. The method of claim 1 wherein the single-wall carbon nanotubes have diameters controlled by the contact time in the contacting step.

39. The method of claim 1 wherein the single-wall carbon nanotubes have lengths controlled by the contact time in the contacting step.

40. The method of claim 1 wherein the contacting is done at a pressure between about 0.1 atmospheres and about 200 atmospheres.

41. The method of claim 1 further comprising removing the catalyst from the carbon product with an acid.

42. The method of claim 41 wherein the acid is selected from the group consisting of citric acid, acetic acid, nitric acid, sulfuric acid, hydrochloric acid, hydrofluoric acid and combinations thereof.

43. The method of claim 41 wherein the acid comprises hydrochloric acid.

44. The method of claim 1 wherein at least about 50 wt % of carbon in the carbon product is single-wall carbon nanotubes.

45. The method of claim 1 wherein at least about 80 wt % of carbon in the product is single-wall carbon nanotubes.

46. The method of claim 1 wherein at least about 90 wt % of carbon in the product is single-wall carbon nanotubes.

47. The method of claim 1 wherein at least about 95 wt % of carbon in the product is single-wall carbon nanotubes.

48. The method of claim 1 wherein the catalyst is flowed through a transport reactor entrained in the gaseous stream comprising the carbon-containing feedstock.

49. The method of claim 48 wherein at least one other gaseous stream comprising the carbon-containing feedstock is introduced to the reactor at more than one inlet.

50. The method of claim 49 wherein the at least one other gaseous stream comprises hydrogen.

51. The method of claim 48 wherein the reactor comprises more than one zone wherein each zone is capable of maintaining a different set of reaction conditions.

52. The method of claim 48 wherein the reactor further comprises a solid-gas separator selected from the group consisting of a wet scrubber, a cyclone, an electrostatic precipitator, filter, and combinations thereof.

53. The method of claim 48 wherein a dispersing aid is used in the transport reactor.

54. The method of claim 53 wherein the dispersing aid is a material selected from the group consisting of metal oxide particles, sand, quartz beads, ceramic particles, refractory material and combinations thereof.

55. The method of claim 1 wherein the catalyst is fluidized by the gaseous stream comprising the carbon-containing feedstock in a fluidized bed reactor.

56. The method of claim 55 wherein the fluidized bed reactor comprises more than one zone wherein each zone is capable of maintaining a different set of reaction conditions.

57. The method of claim 55 wherein a fluidizing aid is fluidized in the fluidized bed reactor.

58. The method of claim 57 wherein the catalyst and the carbon product are separated from the fluidizing aid by differential elutriation.

59. The method of claim 57 wherein the fluidizing aid exchanges heat with the catalyst.

60. The method of claim 57 wherein the fluidizing aid acts as a reactor wall scrubber.

61. The method of claim 57 wherein the fluidizing aid is a material selected from the group consisting of metal oxide particles, sand, quartz beads, ceramic particles, refractory material and combinations thereof.

62. The method of claim 1 wherein the contacting occurs in a moving bed reactor, wherein the reactor has a moving bed comprising the catalyst and essentially-inert particles.

63. The method of claim 62 wherein the moving bed reactor comprises more than one zone wherein each zone is capable of maintaining a different set of reaction conditions.

64. The method of claim 62 wherein the gaseous stream comprising the carbon-containing feedstock is introduced into the reactor at more than one inlet.

65. The method of claim 62 wherein the essentially-inert particles comprise a material selected from the group consisting of metal oxide particles, sand, quartz beads, ceramic particles, refractory material and combinations thereof.

66. The method of claim 62 wherein the essentially-inert particles are removed from the reactor, circulated and re-introduced to the reactor.

67. The method of claim 62 where the essentially-inert particles are regenerated after exiting the reactor.

68. The method of claim 62 wherein the essentially-inert particles are heated after exiting the reactor to produce essentially-inert heated particles.

69. The method of claim 67 wherein the essentially-inert heated particles are introduced into the reactor and exchange heat with the catalyst.

70. The method of claim 62 further comprising separating the catalyst and the carbon product from the essentially-inert particles.

71. The method of claim 70 wherein the separating is done by differential elutriation.

72. The method of claim 70 wherein the separating comprises a component selected from the group consisting of a cyclone, a classifier, a solid-gas separator, a disengaging section, a wet scrubber, a cyclone, an electrostatic precipitator, a filter and combinations thereof.

73. The method of claim 62 wherein the moving bed reactor is a counter-current moving bed reactor, wherein the counter-current moving bed reactor has a moving bed comprising the essentially-inert particles that move in a direction counter-current to flows of the catalyst and the gaseous stream comprising the carbon-containing feedstock.

74. The method of claim 62 wherein the moving bed reactor is a concurrent-flow moving bed reactor wherein the essentially-inert particles and the catalyst flow in the same direction.

75. The method of claim 74 wherein the gaseous stream comprising the carbon-containing feedstock, the essentially inert particles and the catalyst flow in the same direction.

76. The method of claim 74 wherein the gaseous stream comprising the carbon-containing feedstock flows in an opposite direction to movement of the essentially-inert particles and the catalyst.

77. A method for producing single-wall carbon nanotubes, comprising:
(a) combusting a foaming agent with precursors of catalytic metal comprising at least one metal from the group consisting of Group VIB and Group VIIIB and a support selected from the group consisting of oxides of aluminum, magnesium, silicon, zirconium and combinations thereof to form a catalyst;
(b) sulfiding the catalyst which is a solid solution; and
(c) contacting the catalyst with a gaseous stream comprising a carbon-containing feedstock at a sufficient temperature and for a contact time sufficient to make a carbon product comprising single-wall carbon nanotubes.

78. The method of claim 77 wherein the catalytic metal comprise Co and Mo.

79. The method of claim 77 wherein the support is magnesia.

80. The method of claim 77 wherein the foaming agent is selected from the group consisting of citric acid, urea, glycine, hydrazine, sucrose, carbohydrazide, oxalyl dihydrazide, sugars, alcohols, and combinations thereof.

81. The method of claim 80 wherein the foaming agent comprises citric acid.

82. The method of claim 77 wherein the combusting is conducted by exposing the precursors to temperatures in the range of about 150° C. and about 1200° C.

83. The method of claim 77 wherein the combusting is conducted by exposing the precursors to temperatures in the range of about 200° C. and about 700° C.

84. The method of claim 77 wherein the combusting is conducted by exposing the precursors to temperatures in the range of about 250° C. and about 650° C.

85. The method of claim 77 wherein the precursors are sprayed to form an aerosol prior to combustion.

86. The method of claim 77 wherein the combusting comprises contacting the precursors with a heated surface.

87. The method of claim 77 wherein the sulfiding is done by exposing the catalyst to a sulfur-containing compound selected from the group consisting of thiophene, hydrogen sulfide, a mercaptan and combinations thereof.

88. The method of claim 77 wherein the sulfiding is done prior to the contacting step.

89. The method of claim 77 wherein the sulfiding is done with the contacting step.

90. The method of claim 77 wherein the catalyst has a cross-sectional dimension of less than about 100 microns.

91. The method of claim 77 wherein the catalyst has a cross-sectional dimension of less than about 30 microns.

92. The method of claim 77 wherein the catalyst has a bulk density less than about 0.3 g/cm$^3$.

93. The method of claim 77 wherein the catalyst has a bulk density less than about 0.1 g/cm$^3$.

94. The method of claim 77 further comprising reducing the metal prior to the contacting step.

95. The method of claim 94 wherein the reducing is done with a reducing gas.

96. The method of claim 95 wherein the reducing gas comprises hydrogen.

97. The method of claim 77 wherein the metal is reduced during the contacting step.

98. The method of claim 77 wherein the temperature is in a range of about 500° C. and about 1500° C.

99. The method of claim 77 wherein the temperature is in the range of about 650° C. and about 950° C.

100. The method of claim 77 wherein the temperature is in the range of about 800° C. and about 950° C.

101. The method of claim 77 wherein the carbon-containing feedstock comprises a compound selected from the group consisting of methane, hydrocarbons, carbon monoxide and combinations thereof.

102. The method of claim 77 wherein the gaseous stream comprising the carbon-containing feedstock comprises methane.

103. The method of claim 77 further comprising mixing hydrogen with the gasesous stream comprising carbon-containing feedstock.

104. The method of claim 77 wherein the gaseous stream comprising the carbon-containing feedstock also comprises hydrogen.

105. The method of claim 77 wherein the gaseous stream comprising the carbon-containing feedstock comprises a mixture of methane and hydrogen.

106. The method of claim 77 wherein the contact time is in a range of about 0.1 seconds and about 60 minutes.

107. The method of claim 77 wherein the contact time is in a range of about 0.1 seconds and about 30 minutes.

108. The method of claim 77 wherein the contact time is in a range of about 10 seconds and about 10 minutes.

109. The method of claim 77 wherein the single-wall carbon nanotubes have diameters controlled by the contact time in the contacting step.

110. The method of claim 77 wherein the single-wall carbon nanotubes have lengths controlled by the contact time in the contacting step.

111. The method of claim 77 wherein the contacting is done at a pressure between about 0.1 atmospheres and about 200 atmospheres.

112. The method of claim 77 further comprising removing the catalyst from the carbon product with an acid.

113. The method of claim 112 wherein the acid is selected from the group consisting of citric acid, acetic acid, nitric acid, sulfuric acid, hydrochloric acid, hydrofluoric acid and combinations thereof.

114. The method of claim 112 wherein the acid comprises hydrochloric acid.

115. The method of claim 77 wherein at least about 50 wt % of carbon in the carbon product is single-wall carbon nanotubes.

116. The method of claim 77 wherein at least about 80 wt % of carbon in the product is single-wall carbon nanotubes.

117. The method of claim 77 wherein at least about 90 wt % of carbon in the product is single-wall carbon nanotubes.

118. The method of claim 77 wherein at least about 95 wt % of carbon in the product is single-wall carbon nanotubes.

119. The method of claim 77 wherein the catalyst is flowed through a transport reactor entrained in the gaseous stream comprising the carbon-containing feedstock.

120. The method of claim 119 wherein at least one other gaseous stream comprising the carbon-containing feedstock is introduced to the reactor at more than one inlet.

121. The method of claim 120 wherein the at least one other gaseous stream comprises hydrogen.

122. The method of claim 119 wherein the reactor comprises more than one zone wherein each zone is capable of maintaining a different set of reaction conditions.

123. The method of claim 119 wherein the reactor further comprises a solid-gas separator selected from the group consisting of a wet scrubber, a cyclone, an electrostatic precipitator, filter, and combinations thereof.

124. The method of claim 119 wherein a dispersing aid is used in the transport reactor.

125. The method of claim 124 wherein the dispersing aid is a material selected from the group consisting of metal oxide particles, sand, quartz beads, ceramic particles, refractory material and combinations thereof.

126. The method of claim 77 wherein the catalyst is fluidized by the gaseous stream comprising the carbon-containing feedstock in a fluidized bed reactor.

127. The method of claim 126 wherein the fluidized bed reactor comprises more than one zone wherein each zone is capable of maintaining a different set of reaction conditions.

128. The method of claim 126 wherein a fluidizing aid is fluidized in the fluidized bed reactor.

129. The method of claim 128 wherein the catalyst and the carbon product are separated from the fluidizing aid by differential elutriation.

130. The method of claim 128 wherein the fluidizing aid exchanges heat with the catalyst.

131. The method of claim 128 wherein the fluidizing aid acts as a reactor wall scrubber.

132. The method of claim 128 wherein the fluidizing aid is a material selected from the group consisting of metal oxide particles, sand, quartz beads, ceramic particles, refractory material and combinations thereof.

133. The method of claim 77 wherein the contacting occurs in a moving bed reactor, wherein the reactor has a moving bed comprising the catalyst and essentially-inert particles.

134. The method of claim 133 wherein the moving bed reactor comprises more than one zone wherein each zone is capable of maintaining a different set of reaction conditions.

135. The method of claim 133 wherein the gaseous stream comprising the carbon-containing feedstock is introduced into the reactor at more than one inlet.

136. The method of claim 133 wherein the essentially-inert particles comprise a material selected from the group consisting of metal oxide particles, sand, quartz beads, ceramic particles, refractory material and combinations thereof.

137. The method of claim 133 wherein the essentially-inert particles are removed from the reactor, circulated and re-introduced to the reactor.

138. The method of claim 133 where the essentially-inert particles are regenerated after exiting the reactor.

139. The method of claim 133 wherein the essentially-inert particles are heated after exiting the reactor to produce essentially-inert heated particles.

140. The method of claim 133 wherein the essentially-inert heated particles are introduced into the reactor and exchange heat with the catalyst.

141. The method of claim 133 further comprising separating the catalyst and the carbon product from the essentially-inert particles.

142. The method of claim 141 wherein the separating is done by differential elutriation.

143. The method of claim 141 wherein the separating comprises a component selected from the group consisting of a cyclone, a classifier, a solid-gas separator, a disengaging section, a wet scrubber, a cyclone, an electrostatic precipitator, a filter and combinations thereof.

144. The method of claim 133 wherein the moving bed reactor is a counter-current moving bed reactor, wherein the counter-current moving bed reactor has a moving bed comprising the essentially-inert particles that move in a direction counter-current to flows of the catalyst and the gaseous stream comprising the carbon-containing feedstock.

145. The method of claim 133 wherein the moving bed reactor is a concurrent-flow moving bed reactor wherein the essentially-inert particles and the catalyst flow in the same direction.

146. The method of claim 145 wherein the gaseous stream comprising the carbon-containing feedstock, the essentially inert particles and the catalyst flow in the same direction.

147. The method of claim 146 wherein the gaseous stream comprising the carbon-containing feedstock flows in an opposite direction to movement of the essentially-inert particles and the catalyst.

148. A method for producing single-wall carbon nanotubes, comprising:
(a) combusting a foaming agent and precursors of cobalt oxide, molybdenum oxide and magnesium oxide to form a catalyst which is a solid solution;
(b) sulfiding the catalyst; and
(c) contacting the catalyst with a gaseous stream comprising a carbon-containing feedstock at a sufficient temperature and for a contact time sufficient to make a carbon product comprising single-wall carbon nanotubes.

149. The method of claim 148 wherein the foaming agent is selected from the group consisting of citric acid, urea, glycine, hydrazine, sucrose, carbohydrazide, oxalyl dihydrazide, sugars, alcohols, and combinations thereof.

150. The method of claim 148 wherein the foaming agent comprises citric acid.

151. The method of claim 148 wherein the combusting is conducted by exposing the precursors to temperatures in the range of about 150° C. and about 1200° C.

152. The method of claim 148 wherein the combusting is conducted by exposing the precursors to temperatures in the range of about 200° C. and about 700° C.

153. The method of claim 148 wherein the combusting is conducted by exposing the precursors to temperatures in the range of about 250° C. and about 650° C.

154. The method of claim 148 wherein the precursors are sprayed to form an aerosol prior to combustion.

155. The method of claim 148 wherein the combusting comprises contacting the precursors with a heated surface.

156. The method of claim 148 wherein the sulfiding is done by exposing the catalyst to a sulfur-containing compound selected from the group consisting of thiophene, hydrogen sulfide, a mercaptan and combinations thereof.

157. The method of claim 148 wherein the sulfiding is done prior to the contacting step.

158. The method of claim 148 wherein the sulfiding is done with the contacting step.

159. The method of claim 148 wherein the catalyst has a cross-sectional dimension of less than about 100 microns.

160. The method of claim 148 wherein the catalyst has a cross-sectional dimension of less than about 30 microns.

161. The method of claim 148 wherein the catalyst has a bulk density less than about 0.3 g/cm$^3$.

162. The method of claim 148 wherein the catalyst has a bulk density less than about 0.1 g/cm$^3$.

163. The method of claim 148 further comprising reducing the metal prior to the contacting step.

164. The method of claim 163 wherein the reducing is done with a reducing gas.

165. The method of claim 164 wherein the reducing gas comprises hydrogen.

166. The method of claim 148 wherein the metal is reduced during the contacting step.

167. The method of claim 148 wherein the temperature is in a range of about 500° C. and about 1500° C.

168. The method of claim 148 wherein the temperature is in the range of about 650° C. and about 950° C.

169. The method of claim 148 wherein the temperature is in the range of about 800° C. and about 950° C.

170. The method of claim 148 wherein the carbon-containing feedstock comprises a compound selected from the group consisting of methane, hydrocarbons, carbon monoxide and combinations thereof.

171. The method of claim 148 wherein the gaseous stream comprising the carbon-containing feedstock comprises methane.

172. The method of claim 148 further comprising mixing hydrogen with the gasesous stream comprising carbon-containing feedstock.

173. The method of claim 148 wherein the gaseous stream comprising the carbon-containing feedstock also comprises hydrogen.

174. The method of claim 148 wherein the gaseous stream comprising the carbon-containing feedstock comprises a mixture of methane and hydrogen.

175. The method of claim 148 wherein the contact time is in a range of about 0.1 seconds and about 60 minutes.

176. The method of claim 148 wherein the contact time is in a range of about 0.1 seconds and about 30 minutes.

177. The method of claim 148 wherein the contact time is in a range of about 10 seconds and about 10 minutes.

178. The method of claim 148 wherein the single-wall carbon nanotubes have diameters controlled by the contact time in the contacting step.

179. The method of claim 148 wherein the single-wall carbon nanotubes have lengths controlled by the contact time in the contacting step.

180. The method of claim 148 wherein the contacting is done at a pressure between about 0.1 atmospheres and about 200 atmospheres.

181. The method of claim 148 further comprising removing the catalyst from the carbon product with an acid.

182. The method of claim 181 wherein the acid is selected from the group consisting of citric acid, acetic acid, nitric acid, sulfuric acid, hydrochloric acid, hydrofluoric acid and combinations thereof.

183. The method of claim 181 wherein the acid comprises hydrochloric acid.

184. The method of claim 148 wherein at least about 50 wt % of carbon in the carbon product is single-wall carbon nanotubes.

185. The method of claim 148 wherein at least about 80 wt % of carbon in the product is single-wall carbon nanotubes.

186. The method of claim 148 wherein at least about 90 wt % of carbon in the product is single-wall carbon nanotubes.

187. The method of claim 148 wherein at least about 95 wt % of carbon in the product is single-wall carbon nanotubes.

188. The method of claim 148 wherein the catalyst is flowed through a transport reactor entrained in the gaseous stream comprising the carbon-containing feedstock.

189. The method of claim 188 wherein at least one other gaseous stream comprising the carbon-containing feedstock is introduced to the reactor at more than one inlet.

190. The method of claim 189 wherein the at least one other gaseous stream comprises hydrogen.

191. The method of claim 188 wherein the reactor comprises more than one zone wherein each zone is capable of maintaining a different set of reaction conditions.

192. The method of claim 188 wherein the reactor further comprises a solid-gas separator selected from the group consisting of a wet scrubber, a cyclone, an electrostatic precipitator, filter, and combinations thereof.

193. The method of claim 188 wherein a dispersing aid is used in the transport reactor.

194. The method of claim 193 wherein the dispersing aid is a material selected from the group consisting of metal oxide particles, sand, quartz beads, ceramic particles, refractory material and combinations thereof.

195. The method of claim 148 wherein the catalyst is fluidized by the gaseous stream comprising the carbon-containing feedstock in a fluidized bed reactor.

196. The method of claim 195 wherein the fluidized bed reactor comprises more than one zone wherein each zone is capable of maintaining a different set of reaction conditions.

197. The method of claim 195 wherein a fluidizing aid is fluidized in the fluidized bed reactor.

198. The method of claim 197 wherein the catalyst and the carbon product are separated from the fluidizing aid by differential elutriation.

199. The method of claim 197 wherein the fluidizing aid exchanges heat with the catalyst.

200. The method of claim 197 wherein the fluidizing aid acts as a reactor wall scrubber.

201. The method of claim 197 wherein the fluidizing aid is a material selected from the group consisting of metal oxide particles, sand, quartz beads, ceramic particles, refractory material and combinations thereof.

202. The method of claim 148 wherein the contacting occurs in a moving bed reactor, wherein the reactor has a moving bed comprising the catalyst and essentially-inert particles.

203. The method of claim 202 wherein the moving bed reactor comprises more than one zone wherein each zone is capable of maintaining a different set of reaction conditions.

204. The method of claim 202 wherein the gaseous stream comprising the carbon-containing feedstock is introduced into the reactor at more than one inlet.

205. The method of claim 202 wherein the essentially-inert particles comprise a material selected from the group consisting of metal oxide particles, sand, quartz beads, ceramic particles, refractory material and combinations thereof.

206. The method of claim 202 wherein the essentially-inert particles are removed from the reactor, circulated and re-introduced to the reactor.

207. The method of claim 202 where the essentially-inert particles are regenerated after exiting the reactor.

208. The method of claim 202 wherein the essentially-inert particles are heated after exiting the reactor to produce essentially-inert heated particles.

209. The method of claim 202 wherein the essentially-inert heated particles are introduced into the reactor and exchange heat with the catalyst.

210. The method of claim 202 further comprising separating the catalyst and the carbon product from the essentially-inert particles.

211. The method of claim 210 wherein the separating is done by differential elutriation.

212. The method of claim 210 wherein the separating comprises a component selected from the group consisting of a cyclone, a classifier, a solid-gas separator, a disengaging section, a wet scrubber, a cyclone, an electrostatic precipitator, a filter and combinations thereof.

213. The method of claim 202 wherein the moving bed reactor is a counter-current moving bed reactor, wherein the counter-current moving bed reactor has a moving bed comprising the essentially-inert particles that move in a direction counter-current to flows of the catalyst and the gaseous stream comprising the carbon-containing feedstock.

214. The method of claim 202 wherein the moving bed reactor is a concurrent-flow moving bed reactor wherein the essentially-inert particles and the catalyst flow in the same direction.

215. The method of claim 214 wherein the gaseous stream comprising the carbon-containing feedstock, the essentially inert particles and the catalyst flow in the same direction.

216. The method of claim 214 wherein the gaseous stream comprising the carbon-containing feedstock flows in an opposite direction to movement of the essentially-inert particles and the catalyst.

217. A method for producing carbon nanotubes, comprising:
  (a) combusting a foaming agent, precursors of at least one catalytic metal selected from the group selected from Group VIIIB metal precursors, Group VIB metal precursors, and combinations thereof, and refractory material precursors to form a supported catalyst which is a solid solution; and
  (b) contacting the catalyst with a gaseous stream comprising a carbon-containing feedstock at a sufficient temperature and for a contact time sufficient to make a carbon product comprising carbon nanotubes.

218. The method of claim 217 wherein the carbon nanotubes are selected from the group consisting of multiwall carbon nanotubes, single-wall carbon nanotubes and a combination thereof.

219. The method of claim 217 wherein the catalytic metal comprises metals from both Group VIIIB and Group VIB and wherein the Group VIIIB metal and the Group VIB metal have a weight ratio in the range of about 10 to 1 to about 2 to 1.

220. The method of claim 217 wherein the catalytic metal comprises metals from both Group VIIIB and Group VIB and wherein the Group VIIIB metal and the Group VIB metal have a molar ratio in the range of about 20 to 1 to about 3 to 1.

221. The method of claim 217 wherein the catalytic metal is are present on the refractory particles at a loading in the range of about 0.5 wt % and about 10 wt % of the weight of the refractory material.

222. The method of claim 217 wherein the Group VIIIB metal precursor is selected from a Group VIIIB-containing compound wherein the compound is selected the group consisting of a nitrate, a sulfite, a sulfate, a carbonate, an acetate, a citrate, a gluconate, a hexacyanoferrite, an oxalate, a tris(ethylenediamine) sulfate and combinations thereof.

223. The method of claim 217 wherein the Group VIB metal precursor is a Group VI-containing compound wherein the compound is an ammonium compound.

224. The method of claim 217 wherein the refractory material precursor is a nitrate compound.

225. The method of claim 217 wherein the foaming agent is selected from the group consisting of citric acid, urea, glycine, hydrazine, sucrose, carbohydrazide, oxalyl dihydrazide, sugars, alcohols, and combinations thereof.

226. The method of claim 217 wherein the foaming agent comprises citric acid.

227. The method of claim 217 wherein the combusting is conducted by exposing the precursors to temperatures in the range of about 150° C. and about 1200° C.

228. The method of claim 217 wherein the combusting is conducted by exposing the precursors to temperatures in the range of about 200° C. and about 700° C.

229. The method of claim 217 wherein the combusting is conducted by exposing the precursors to temperatures in the range of about 250° C. and about 650° C.

230. The method of claim 217 wherein the precursors are sprayed to form an aerosol prior to combustion.

231. The method of claim 217 wherein the combusting comprises contacting the precursors with a heated surface.

232. The method of claim 217 further comprising sulfiding the catalyst wherein the catalyst is exposed to a sulfur-containing compound.

233. The method of claim 232 wherein the sulfur-containing compound is selected from the group consisting of thiophene, hydrogen sulfide, a mercaptan and combinations thereof.

234. The method of claim 232 wherein the sulfur-containing compound comprises thiophene.

235. The method of claim 232 wherein the sulfiding is done prior to the contacting step.

236. The method of claim 232 wherein the sulfiding is done with the contacting step.

237. The method of claim 217 wherein the catalyst has a cross-sectional dimension of less than about 100 microns.

238. The method of claim 217 wherein the catalyst has a cross-sectional dimension of less than about 30 microns.

239. The method of claim 217 wherein the catalyst has a bulk density less than about 0.3 g/cm$^3$.

240. The method of claim 217 wherein the catalyst has a bulk density less than about 0.1 g/cm$^3$.

241. The method of claim 217 further comprising reducing the metal prior to the contacting step.

242. The method of claim 241 wherein the reducing is done with a reducing gas.

243. The method of claim 242 wherein the reducing gas comprises hydrogen.

244. The method of claim 217 wherein the metal is reduced during the contacting step.

245. The method of claim 217 wherein the temperature is in a range of about 500° C. and about 1500° C.

246. The method of claim 217 wherein the temperature is in the range of about 650° C. and about 950° C.

247. The method of claim 217 wherein the temperature is in the range of about 800° C. and about 950° C.

248. The method of claim 217 wherein the carbon-containing feedstock comprises a compound selected from the group consisting of methane, hydrocarbons, carbon monoxide and combinations thereof.

249. The method of claim 217 wherein the gaseous stream comprising the carbon-containing feedstock comprises methane.

250. The method of claim 217 further comprising mixing hydrogen with the gaseous stream comprising carbon-containing feedstock.

251. The method of claim 217 wherein the gaseous stream comprising the carbon-containing feedstock also comprises hydrogen.

252. The method of claim 217 wherein the gaseous stream comprising the carbon-containing feedstock comprises a mixture of methane and hydrogen.

253. The method of claim 217 further comprising mixing an oxidizing gas with gaseous stream comprising the carbon-containing feedstock.

254. The method of claim 253 wherein the oxidizing gas is selected from the group consisting of oxygen, water vapor, carbon dioxide and combinations thereof.

255. The method of claim 217 wherein the contact time is in a range of about 0.1 seconds and about 60 minutes.

256. The method of claim 217 wherein the contact time is in a range of about 0.1 seconds and about 30 minutes.

257. The method of claim 217 wherein the contact time is in a range of about 10 seconds and about 10 minutes.

258. The method of claim 217 wherein the single-wall carbon nanotubes have diameters controlled by the contact time in the contacting step.

259. The method of claim 217 wherein the single-wall carbon nanotubes have lengths controlled by the contact time in the contacting step.

260. The method of claim 217 wherein the contacting is done at a pressure between about 0.1 atmospheres and about 197 atmospheres.

261. The method of claim 217 further comprising removing the catalyst from the carbon product with an acid.

262. The method of claim 261 wherein the acid is selected from the group consisting of citric acid, acetic acid, nitric acid, sulfuric acid, hydrochloric acid, hydrofluoric acid and combinations thereof.

263. The method of claim 261 wherein the acid comprises hydrochloric acid.

264. The method of claim 217 wherein at least about 50 wt % of carbon in the carbon product is single-wall carbon nanotubes.

265. The method of claim 217 wherein at least about 80 wt % of carbon in the product is single-wall carbon nanotubes.

266. The method of claim 217 wherein at least about 90 wt % of carbon in the product is single-wall carbon nanotubes.

267. The method of claim 217 wherein at least about 95 wt % of carbon in the product is single-wall carbon nanotubes.

268. The method of claim 217 wherein the catalyst is flowed through a transport reactor entrained in the gaseous stream comprising the carbon-containing feedstock.

269. The method of claim 268 wherein at least one other gaseous stream comprising the carbon-containing feedstock is introduced to the reactor at more than one inlet.

270. The method of claim 269 wherein the at least one other gaseous stream comprises hydrogen.

271. The method of claim 268 wherein the reactor comprises more than one zone wherein each zone is capable of maintaining a different set of reaction conditions.

272. The method of claim 268 wherein the reactor further comprises a solid-gas separator selected from the group consisting of a wet scrubber, a cyclone, an electrostatic precipitator, filter, and combinations thereof.

273. The method of claim 268 wherein a dispersing aid is used in the transport reactor.

274. The method of claim 273 wherein the dispersing aid is a material selected from the group consisting of metal oxide particles, sand, quartz beads, ceramic particles, refractory material and combinations thereof.

275. The method of claim 217 wherein the catalyst is fluidized by the gaseous stream comprising the carbon-containing feedstock in a fluidized bed reactor.

276. The method of claim 275 wherein the fluidized bed reactor comprises more than one zone wherein each zone is capable of maintaining a different set of reaction conditions.

277. The method of claim 275 wherein a fluidizing aid is fluidized in the fluidized bed reactor.

278. The method of claim 277 wherein the catalyst and the carbon product are separated from the fluidizing aid by differential elutriation.

279. The method of claim 277 wherein the fluidizing aid exchanges heat with the catalyst.

280. The method of claim 277 wherein the fluidizing aid acts as a reactor wall scrubber.

281. The method of claim 277 wherein the fluidizing aid is a material selected from the group consisting of metal oxide particles, sand, quartz beads, ceramic particles, refractory material and combinations thereof.

282. The method of claim 217 wherein the contacting occurs in a moving bed reactor, wherein the reactor has a moving bed comprising the catalyst and essentially-inert particles.

283. The method of claim 282 wherein the moving bed reactor comprises more than one zone wherein each zone is capable of maintaining a different set of reaction conditions.

284. The method of claim 282 wherein the gaseous stream comprising the carbon-containing feedstock is introduced into the reactor at more than one inlet.

285. The method of claim 282 wherein the essentially-inert particles comprise a material selected from the group consisting of metal oxide particles, sand, quartz beads, ceramic particles, refractory material and combinations thereof.

286. The method of claim 282 wherein the essentially-inert particles are removed from the reactor, circulated and re-introduced to the reactor.

287. The method of claim 282 where the essentially-inert particles are regenerated after exiting the reactor.

288. The method of claim 282 wherein the essentially-inert particles are heated after exiting the reactor to produce essentially-inert heated particles.

289. The method of claim 282 wherein the essentially-inert heated particles are introduced into the reactor and exchange heat with the catalyst.

290. The method of claim 282 further comprising separating the catalyst and the carbon product from the essentially-inert particles.

291. The method of claim 290 wherein the separating is done by differential elutriation.

292. The method of claim 290 wherein the separating comprises a component selected from the group consisting of a cyclone, a classifier, a solid-gas separator, a disengaging section, a wet scrubber, a cyclone, an electrostatic precipitator, a filter and combinations thereof.

293. The method of claim 282 wherein the moving bed reactor is a counter-current moving bed reactor, wherein the counter-current moving bed reactor has a moving bed comprising the essentially-inert particles that move in a direction counter-current to flows of the catalyst and the gaseous stream comprising the carbon-containing feedstock.

294. The method of claim 282 wherein the moving bed reactor is a concurrent-flow moving bed reactor wherein the essentially-inert particles and the catalyst flow in the same direction.

295. The method of claim 294 wherein the gaseous stream comprising the carbon-containing feedstock, the essentially inert particles and the catalyst flow in the same direction.

296. The method of claim 294 wherein the gaseous stream comprising the carbon-containing feedstock flows in an opposite direction to movement of the essentially-inert particles and the catalyst.

* * * * *

UNITED STATES PATENT AND TRADEMARK OFFICE
CERTIFICATE OF CORRECTION

| | | |
|---|---|---|
| PATENT NO. | : 7,250,148 B2 | Page 1 of 1 |
| APPLICATION NO. | : 10/630054 | |
| DATED | : July 31, 2007 | |
| INVENTOR(S) | : Yuemei Yang, Martin P. Grosboll and Kenneth A. Smith | |

It is certified that error appears in the above-identified patent and that said Letters Patent is hereby corrected as shown below:

In column 34, line 44, insert -- which is a solid solution -- after "catalyst".

In column 34, line 45, delete "which is a solid solution" after "catalyst".

In column 41, line 16, delete "particles" and insert -- material --.

In column 42, line 53, delete "197" and insert -- 200 --.

Signed and Sealed this

Eighteenth Day of September, 2007

JON W. DUDAS
*Director of the United States Patent and Trademark Office*